United States Patent
Veryasov et al.

(10) Patent No.: US 11,964,868 B2
(45) Date of Patent: Apr. 23, 2024

(54) PROCESS TO CONDUCT AN ENDOTHERMIC STEAM REFORMING REACTION IN A FLUIDIZED BED REACTOR

(71) Applicant: TOTALENERGIES ONETECH, Courbevoie (FR)

(72) Inventors: Gleb Veryasov, Nivelles (BE); Nikolai Nesterenko, Nivelles (BE); Walter Vermeiren, Houthalen (BE)

(73) Assignee: TOTALENERGIES ONETECH, Courbevoie (FR)

( * ) Notice: Subject to any disclaimer, the term of this patent is extended or adjusted under 35 U.S.C. 154(b) by 0 days.

(21) Appl. No.: 18/017,362

(22) PCT Filed: Jul. 27, 2021

(86) PCT No.: PCT/EP2021/071019
§ 371 (c)(1),
(2) Date: Jan. 20, 2023

(87) PCT Pub. No.: WO2022/023351
PCT Pub. Date: Feb. 3, 2022

(65) Prior Publication Data
US 2023/0271831 A1 Aug. 31, 2023

(30) Foreign Application Priority Data
Jul. 28, 2020 (EP) ..................... 20315365

(51) Int. Cl.
*C01B 3/44* (2006.01)
*B01J 8/18* (2006.01)
(Continued)

(52) U.S. Cl.
CPC .............. *C01B 3/44* (2013.01); *B01J 8/1827* (2013.01); *B01J 8/1836* (2013.01); *B01J 8/28* (2013.01);
(Continued)

(58) Field of Classification Search
CPC .............. C01B 3/44; C01B 2203/0233; C01B 2203/085; C01B 2203/1241; B01J 8/1827;
(Continued)

(56) References Cited

U.S. PATENT DOCUMENTS 3,147,080 A 9/1964 Jahnig
3,254,957 A 6/1966 Meiers et al.
(Continued)

FOREIGN PATENT DOCUMENTS

GB 883579 11/1961
GB 1262166 2/1972
(Continued)

OTHER PUBLICATIONS

Solid-State Electrolytes for Lithium-ion Batteries: Fundamentals, Challenges and Perspectives Wenjia Zhao et al Electrochemical Energy Reviews, V 2, pp. 574-605 (Year: 2019).*
(Continued)

*Primary Examiner* — Douglas B Call
(74) *Attorney, Agent, or Firm* — Nath, Goldberg & Meyer; Joshua B. Goldberg

(57) ABSTRACT

The disclosure relates to a process to perform an endothermic steam reforming of hydrocarbons, said process comprising the steps of providing a fluidized bed reactor comprising at least two electrodes and a bed comprising particles, wherein the particles are put in a fluidized state to obtain a fluidized bed; heating the fluidized bed to a temperature ranging from 500° C. to 1200° C. by passing an
(Continued)

electric current through the fluidized bed to conduct the endothermic reaction. The process is remarkable in that the particles of the bed comprise electrically conductive particles and particles of a catalytic composition, wherein at least 10 wt. % of the particles are electrically conductive particles and have a resistivity ranging from 0.001 to 500 Ohm·cm at 800° C. and in that the step of heating the fluidized bed is performed by passing an electric current through the fluidized bed.

16 Claims, 3 Drawing Sheets

(51) Int. Cl.
*B01J 8/28* (2006.01)
*B01J 8/42* (2006.01)

(52) U.S. Cl.
CPC ........ *B01J 8/42* (2013.01); *B01J 2208/00398* (2013.01); *B01J 2208/00805* (2013.01); *C01B 2203/0233* (2013.01); *C01B 2203/085* (2013.01); *C01B 2203/1241* (2013.01)

(58) Field of Classification Search
CPC ..... B01J 8/1836; B01J 8/28; B01J 8/42; B01J 2208/00398; B01J 2208/00805
USPC ........................................................ 252/373
See application file for complete search history.

(56) References Cited

U.S. PATENT DOCUMENTS

| | | | | |
|---|---|---|---|---|
| 5,114,700 | A | * | 5/1992 | Meihack ................. C01B 17/06 165/172 |
| 5,624,964 | A | * | 4/1997 | Cimini ..................... C01B 3/44 518/704 |
| 9,314,761 | B2 | | 4/2016 | Tetzlaff |
| 2020/0061565 | A1 | * | 2/2020 | Kolios ................... B01J 8/0492 |
| 2021/0113996 | A1 | * | 4/2021 | Li ........................... B01J 23/63 |

FOREIGN PATENT DOCUMENTS

| WO | WO2018083002 | * | 5/2018 |
|---|---|---|---|
| WO | WO2018226635 | * | 12/2018 |

OTHER PUBLICATIONS

International Search Report dated Nov. 3, 2021 issued in corresponding International Application No. PCT/EP2021/071019.
Written Opinion dated Nov. 3, 2021 issued in corresponding International Application No. PCT/EP2021/071019.
PCT—Direct/Informational Comments dated Jul. 27, 2021 submitted in International Application No. PCT/EP2021/071019.

* cited by examiner

PROCESS TO CONDUCT AN ENDOTHERMIC STEAM REFORMING REACTION IN A FLUIDIZED BED REACTOR

This is a National Phase Application filed under 35 U.S.C. 371 as a national stage of PCT/EP2021/071019, filed Jul. 27, 2021, an application claiming the benefit of European Application No. 20315365.5, filed Jul. 28, 2020, the content of each of which is hereby incorporated by reference in its entirety.

TECHNICAL FIELD

The present disclosure relates to a process for performing an endothermic reaction in an installation comprising at least one fluidized bed reactor, the process is performed without the need of an external heating device in the said fluidized bed reactor. The present disclosure aims to contribute to the replacement of the use of fossil carbon-based fuels heating devices. The present disclosure relates to the electrification of the chemical industry.

TECHNICAL BACKGROUND

Climate change and ongoing energy transition make it mandatory to replace fossil carbon-based fuels in chemical production and recycled processes with a more environmentally friendly decarbonized source of energy. Transforming natural gas into valuable chemicals requires elevated temperature, often higher than 800° C. and even up to 1000° C. and are often endothermic. The energy needed is, therefore, high and not often environmentally friendly, as demonstrated by the common use of fired heated reactors. Several studies have been undertaken to reduce the burden imposed by these (harsh) reaction conditions.

The study of Asensio J. M. et al., entitled "Hydrodeoxygenation using magnetic induction: high-temperature heterogeneous catalysis in solution" (Angew. Chem. Int. Ed., 2019, 58, 1-6) describes the use of magnetic nanoparticles as heating agents to improve the energy efficiency of reactions performed at high temperature, as the heat can be then directly and homogeneously transferred to the medium without the need for heating the reactor walls. This was applied in the hydrodeoxygenation of ketones. However, in such a system, relatively low temperatures up to 280° C. were reached and the reaction is exothermic.

In the study of Wismann S. T. et al., entitled "Electrified methane reforming: A compact approach to greener industrial hydrogen production" (Science, 2019, 364, 756-759), a conventional fired reactor was replaced by an electric-resistance-heated reactor. A laboratory-scale reactor based on FeCrAl alloy tube having a diameter of 6 mm and coated with a 130-µm nickel-impregnated washcoat was used to carry out steam methane reforming. As the heat source and the wall of the tube are one, it is possible to minimize the loss of heat and then to render more efficient and more economical the process of steam methane reforming. Temperatures with a maximum of 800° C. were reached with this kind of reactor.

In the study of Malerod-Fjeld H. et al., entitled "Thermo-electrochemical production of compressed hydrogen from methane with near-zero energy loss" (Nat. Energy, 2017, 2, 923-931), a ceramic tube, having an outer diameter of 1 cm and made of a perovskite derivative, is used as the electrolyte. By applying a voltage and hence a current across the electrolyte, hydrogen can be selectively extracted from methane and steam. The perovskite derivative is supplemented with nickel nanoparticles to provide the catalyst necessary for the reaction.

In the study of Varsano F. et al., entitled "Dry reforming of methane powered by magnetic induction" (Int. J. of Hydrogen Energy, 2019, 44, 21037-21044), electromagnetic induction heating of catalytic heterogeneous processes was used and has been demonstrated as bringing several advantages in terms of process intensification, energy efficiency, reactor setup simplification and safety issues coming from the use of radiofrequency. Temperatures ranging between 850° C. and 900° C. in reactors having 1 cm of inner diameter can be reached using $Ni_{60}Co_{60}$ pellets as heat mediators in a continuous-flow fixed-bed reactor.

These examples show that progress exists in the field of transforming fossils sources into valuable chemicals with the perspective to diminish the impact on the climate. However, this progress has not been developed to a large scale as it is rather limited to the laboratory environment.

With regards to this matter, the Shawinigan process, described in CA 573348, relates to a process to prepare hydrocyanic acid from ammonia using in a fluidized bed reactor made of high temperature-resistant silica glass and comprising conductive carbon particles, such as coke and/or petroleum coke. The principle resides in that the electricity is used to heat the conductive carbon particles which can maintain the fluidized bed at a temperature sufficient to transform ammonia into hydrocyanic acid, which is then recovered from the outgoing gas coming off the fluidized bed. The inner diameter of the reactor tube was 3.4 cm. A temperature ranging between 1300° C. and 1600° C., sufficient to perform the requested reaction, can be reached by using such conductive carbon particles.

U.S. Pat. No. 2,982,622 describes a method for producing hydrogen and high quality coke which comprises passing inert solid particles as a relatively dense mass downwardly through an elongated reaction zone, applying an electrical voltage of 0.1 to 1000 volts per inch across at least a portion of said solids mass in said reaction zone, said voltage being sufficient to raise the temperature of said solids to 1800 to 3000 F. due to their resistance to the flow of electricity without causing substantial electrical spark discharges through said solids mass, downwardly withdrawing thus heated solids from said reaction zone, preheating a hydrocarbon feed by heat exchange with said withdrawn solids and introducing said preheated feed into and upwardly through said reaction zone in the form of an upwardly moving gasiform stream, said feed contacting said heated solids and being converted to light vapors including a substantial portion of hydrogen and carbon which deposits on said solids, heat exchanging hot vapors withdrawn from said reaction zone with inert solids in a heating zone, circulating at least a portion of the solids withdrawn from the reaction zone and previously heat exchanged with said feed to said heating zone, passing solids from said heating zone to said reaction zone as solids feed thereto, and recovering at least a portion of the solids withdrawn from the reaction zone as product and recovering hydrogen gas and light vapors from the upper portion of said reaction zone.

U.S. Pat. No. 3,259,565 describes a process for converting hydrocarbons to produce lower boiling hydrocarbons and solid coke particles of a size larger than fluidizable size which comprises passing coke agglomerates down through a hot fluidized bed of coke particles, introducing hydrocarbon oil feed into said fluidized bed to crack the hydrocarbon oil, passing cracked vaporous products overhead, removing coke agglomerates from said fluid bed and passing them down through a heat exchanger zone in counter-current contact with said withdrawn cracked vaporous products to cool said cracked vaporous products and to heat said coke agglomerates while condensing and depositing higher boiling hydrocarbons from said cracked vaporous products on said coke agglomerates, withdrawing resulting cracked vaporous products as product, recirculating the so treated coke agglomerates a number of times through said heat exchange zone to deposit hydrocarbons and through said hot fluidized coke bed to coke the deposited high boiling hydrocarbons and to increase the size of the coke agglomerates, withdrawing coke agglomerates of increased size as product from the system.

The disclosure of US 2017/0158516 described a fluidized-bed reactor made of silicon carbide for preparing granular polycrystalline silicon at the industrial level. The fluidized-bed reactor is heated using a heating device which is placed in an intermediate jacket between the outer wall of the reactor tube and the inner wall of the reactor vessel. Such intermediate jacket comprises an insulation material and is filled or flushed with an inert gas. It was found that the use of sintered silicon carbide (SSiC) having a SiC content of 98% by weight as the main element of the reactor tube with a high purity SiC coating deposited by chemical vapour deposition allowed reaching high temperature up to 1200° C. without the tube being corroded. It was also found that using siliconized silicon carbide (SiSiC) as the main element of the reactor tube without any surface treatment, such as the deposition of a coating layer, led to the tube being corroded.

On the other hand, the disclosure of Goldberger W. M. et al., entitled "The electrothermal fluidized bed" (*Chem. Eng. Progress*, 1965, 61 (2), 63-67, relates to fluidized-bed reactor made in graphite and susceptible to perform reactions such as the hydrocracking of hydrocarbons, the pyrolysis of organics, the production of elemental phosphorus or the chlorination of zirconium oxide. Operation at temperatures up to about 4400° C. appears possible. However, it is not certain that from the long-term perspective, the graphite material used to design the fluidized-bed reactor can resist such harsh reaction conditions. Indeed, in the study of Uda T. et al., entitled "*Experiments on high temperature graphite and steam reactions under loss of coolant accident conditions*", (*Fusion Engineering and Design*, 1995, 29, 238-246), it has been shown that graphite corrodes under conditions involving steam and elevated temperature, for instance between 1000° C. and 1600° C. Also, as shown in the study of Qiao M-X. et al., entitled "*Corrosion of graphite electrode in electrochemical advanced oxidation processes: degradation protocol and environmental application*", (*Chem. Eng. J.*, 2018, 344, 410-418), the graphite is susceptible to carbon oxidation reaction, which impacts its activity as an electrode by restricting notably the voltage that can be applied to it.

A hydrocarbon reformer is a device based on steam reforming (SR), autothermal reforming (ATR) or partial oxidation (POx) in presence of steam and/or oxygen using a catalyst (usually nickel) at high temperature and pressure. The available reforming technologies differentiate by the way of getting the heat into the process or the means of heat transfer: convective heat transfer, radiant heat transfer and internal combustion.

1. Steam reforming (SR), being very endothermic, uses an external source of heat to heat multiple tubes, containing the catalyst that converts steam and light hydrocarbons into hydrogen and carbon monoxide (syngas). Steam reforming of light hydrocarbons, in particular of methane (SMR) for the production of synthesis gas are well known. The steam methane reforming process involves reacting a hydrocarbon feedstock (such as natural gas, refinery gas, or naphtha) with steam at elevated temperatures (up to about 1050° C.) and in the presence of a catalyst to produce a gas mixture primarily composed of hydrogen and carbon monoxide, commonly known as syngas or synthesis gas. The hydrocarbon feedstock can be any that can be vaporised and can be desulphurized to permit the catalytic reaction with steam. Usually, it has a boiling point under 250° C. and preferably it is gaseous, natural gas is most suitable.

The synthesis gas exiting the reformer contains carbon monoxide (CO) along with hydrogen, carbon dioxide ($CO_2$), steam and unconverted methane according to the equilibria (thermodynamically controlled) established in the following reactions:

$CH_4 + H_2O \leftrightarrows 3H_2 + CO$ Steam Reforming, endothermic, $\Delta H_r = -206$ kJ/mol $H_2O + CO \leftrightarrows H_2 + CO_2$ Water Gas Shift, exothermic, $\Delta H_r = 41$ kJ/mol $CH_4 + CO_2 \leftrightarrows 2H_2 + 2CO$ $CO_2$ Reforming, endothermic, $\Delta H_r = -247$ kJ/m Therefore, the reformer effluent composition depends on several variables including pressure, temperature, the molar ratio of steam/methane in the reactor feed and carbon dioxide concentration in the reactor feed. These reactions are generally carried out at high temperatures (700°-1050° C.) and high pressures (0.5-3.0 MPa) wherein the reactants are contacted with a metal-based catalyst. A typical SMR effluent composition (mole fractions) is composed of 73% $H_2$, 13% CO, 8.5% $CO_2$ and 5.5% $CH_4$ when the SMR reaction is conducted at 850° C. and 25 atmospheres using a $CO_2$-free feed mixture containing a 3:1 water/methane molar ratio. The final hydrogen to carbon monoxide ratio can be controlled by adding carbon dioxide to the feed. The furnace consists of a box-type radiant section including the burners and a convection section to recover the waste heat of the flue gases leaving the radiant section. In the radiant section, a nickel catalyst is loaded in several high alloy reforming tubes placed in rows along with the furnace. The outer diameter of the tubes ranges typically from 5 to 25 cm and the length is from 10 to 15 m. Typical inlet temperatures to the catalyst bed are 450-650° C., and product syngas leaves at 800-950° C. Tubular reformers are designed with a variety of tube and burner arrangements, including side-fired furnaces, top-fired furnaces and terrace wall furnaces. The necessary heat for the reaction is supplied from the outside of the tubes usually by a combination of radiation and convection to the outer wall of the reformer tube. Subsequently, the heat is transferred to the inner side of the tube by heat conduction through the tube wall and is transferred to the gas phase by convection. Finally, the heat is transferred from the gas phase to the catalyst pellet by convection. The catalyst temperature can be more than 100° C. lower than the inner tube wall temperature. The heat required in the tubular reformer (and hence the cost) may be reduced by increased preheat temperature. When higher hydrocarbons, like ethane, propane or naphtha-type molecules, are present in the feed during preheat steam cracking can result in olefins that easily form carbon in the reformer. In such cases, an adiabatic pre-reformer is added where the higher hydrocarbons are reformed into synthesis gas in the temperature range of 350-600° C., at which conditions the reforming and shift reactions are equilibrated. After the pre-reformer, the gases can be preheated to temperatures around 650° C. In general, the pre-reformer captures also all the sulphur and hence protects the sulphur-sensitive catalyst in the tubular reformer. The pre-reformer is generally a fixed bed reactor operating under adiabatic conditions without heat injection to maintain the reaction temperature.

2. Autothermal reforming (ATR) uses oxygen and eventually steam and carbon dioxide to partially oxidize (internal combustion) the hydrocarbons:

$CH_4 + 0.5O_2 \leftrightarrows 2H_2 + CO$ partial oxidation, exothermic, $\Delta H_r = -519$ kJ/mol $2CH_4 + 0.5O_2 + CO_2 \leftrightarrows 5H_2 + 3CO$ autothermal reforming, $\Delta H_r = -272$ kJ/mol $2CH_4 + 0.5O_2 \cdot H_2O \leftrightarrows 5H_2 + 2CO$ autothermal reforming, $\Delta H_r = -313$ kJ/mol By adding steam or carbon dioxide the hydrogen to carbon monoxide ratio can be controlled according to the above-reported reactions. Autothermal reforming is essentially exothermic (extend depending on the amount of added steam or carbon dioxide) and can be operated in a single reactor vessel as no heat has to be injected into the reactor to maintain the appropriate reaction temperature.

Industrially steam reforming and autothermal reforming or partial oxidation can be applied individually but can also be combined. An endothermal steam tubular reformer can be operated at partial conversion, adding oxygen or air to the effluent that is subsequently sent to an exothermal autothermal reformer. Such configurations allow to reach very high conversion (methane slip) and reduce heat transfer equipment but reduce the hydrogen to carbon monoxide ratio. In the case of secondary reforming air is used to supply the needed nitrogen for ammonia synthesis. In the autothermal reforming, the added oxygen is converted by combustion and since the combustion reaction is exothermic, the temperature in the ATR is raised to about 1000 to 1050° C. The sensible heat in such reaction effluent of an autothermal reformer can be used to heat a heat-exchanger reformer (often called gas-heated reformer) by convective heat transfer. Such heat-exchanger (shell and tube exchanger or dual tube exchanger) reformer reactors are generally placed between a steam tubular reformer or pre-former and the autothermal reformer.

The autothermal reforming stage may be conducted with air (21 vol % oxygen) or with enriched air, i.e. a gas containing 30 to 70 vol % $O_2$, more preferably 40 to 50 vol % $O_2$ to produce ammonia synthesis gas. When producing synthesis gas for hydrogen or methanol production, the autothermal reforming stage may be conducted with a gas containing at least 70 vol oxygen, preferably nearly 100 vol % oxygen.

The obtained syngas is used as a feedstock gas for multiple processes and can be converting into ammonia, methanol or higher alcohols, DME, into hydrocarbons (paraffins and olefins) by Fischer-Tropsch synthesis, or hydrogen. The use of syngas for the production of hydrogen is the primary commercial application of the SMR process. Hydrogen production incorporates several subsystems: i) feed pre-treatment, ii) reforming and heat recovery (including the steam system), iii) carbon monoxide conversion (water gas shift reaction), and iv) hydrogen purification (typically hydrogen pressure swing adsorption).

U.S. Pat. No. 3,147,080 describes a steam reforming process that can be carried out in a fluidized bed at a temperature in the range from 750° C. to 1650° C. An electrical resistance tubular heating element is lined in the interior of the reactor tube and is made of metallic alloy or silicon carbide. The heating element is also filled with particles of reforming catalyst, such as nickel-magnesia.

The present disclosure aims to provide a large-scale solution to one or more of the problems encountered in the prior art that is suitable for application in the industry, such as the chemical industry. The present disclosure aims to contribute to the replacement of the use of fossil carbon-based fuels heating devices in fluidized bed reactors. The present disclosure provides a solution to conduct endothermic steam reforming of light hydrocarbons into a mixture of hydrogen and carbon monoxide (syngas).

SUMMARY

According to a first aspect, the disclosure provides for a process to perform an endothermic steam reforming of hydrocarbons to produce synthesis gas, said process comprising the steps of:

a) providing at least one fluidized bed reactor comprising at least two electrodes and a bed comprising particles;
b) putting the particles of the bed in a fluidized state by passing upwardly through the said bed a fluid stream, to obtain a fluidized bed;
c) heating the fluidized bed to a temperature ranging from 500° C. to 1200° C. to conduct the endothermic steam reforming reaction of a hydrocarbon feedstock in presence of steam;
d) obtaining a reactor effluent containing hydrogen ($H_2$), carbon monoxide (CO), carbon dioxide ($CO_2$) and unconverted hydrocarbons and steam;

the process is remarkable in that the particles of the bed comprise electrically conductive particles and particles of a catalytic composition, wherein at least 10 wt. % of the particles based on the total weight of the particles of the bed are electrically conductive particles, have a resistivity ranging from 0.001 Ohm·cm to 500 Ohm·cm at 800° C. the electrically conductive particles are or comprise one or more particles selected from one or more non-metallic resistors, one or more metallic carbides, one or more transition metal nitrides, one or more metallic phosphides, one or more superionic conductors, one or more phosphate electrolytes, one or more mixed oxides being doped with one or more lower-valent cations, one or more mixed sulphides being doped with one or more lower-valent cations, and any mixture thereof; and in that the step (c) of heating the fluidized bed is performed by passing an electric current through the fluidized bed.

For example, the fluid stream provided in step b) is a mixture of hydrocarbon feedstock and steam. The fluid stream may be a gaseous stream and/or a vaporized stream.

Surprisingly, it has been found that the use of electrically conductive particles such as silicon carbide, mixed oxides, and/or mixed sulphides, said mixed oxides and/or said mixed sulphides being an ionic or mixed conductor, namely being doped with one or more lower-valent cations, in one or more fluidized bed reactors which are electrified allows maintaining a temperature sufficient to carry out an endothermic steam reforming reaction requesting high-temperature conditions such as temperature reaction ranging from 500° C. to 1200° C. without the need of any external heating device. The use of at least 10 wt. % of electrically conductive particles within the particles of the bed allows minimizing the loss of heat when a voltage is applied. Thanks to the Joule effect, most, if not all, the electrical energy is transformed into heat that is used for the heating of the reactor medium.

In a preferred embodiment, the volumetric heat generation rate is greater than 0.1 MW/m³ of fluidized bed, more preferably greater than 1 MW/m³, in particular, greater than 3 MW/m³.

In a preferred embodiment, at least one fluidized bed reactor is devoid of heating means; for example, at least one fluidized bed reactor comprises a vessel and is devoid of heating means located around or inside the vessel. For example, at least one fluidized bed reactor is devoid of heating means selected from ovens, gas burners, hot plates, or any combination thereof. For example, all the fluidized bed reactors are devoid of heating means selected from ovens, gas burners, hot plates, or any combination thereof.

The solid particulate material (i.e., the particles) used in the at least one fluidized bed reactor consists of solid particulates having electrical conductivity allowing generating heat and catalytic particulate material to catalyse the steam reforming of hydrocarbons. The catalytic particulate material can also be electrically conductive and hence contribute to the generation of heat for the endothermal steam reforming.

The electrically conductive particles of the bed

For example, the content of electrically conductive particles is ranging from 10 wt. % to 100 wt. % based on the total weight of the particles of the bed; preferably, from 15 wt. % to 95 wt. %, more preferably from 20 wt. % to 90 wt. %, even more preferably from 25 wt. % to 80 wt. % and most preferably from 30 wt. % to 75 wt. %. In the case where the content of electrically conductive particles based on the total weight of the particles of the bed is 100 wt. %, at least a part of said electrically conductive particles are also catalytic particles.

For example, the content of electrically conductive particles based on the total weight of the bed is at least 12 wt. % based on the total weight of the particles of the bed; preferably, at least 15 wt. %, more preferably, at least 20 wt. %; even more preferably at least 25 wt. %, and most preferably at least 30 wt. % or at least 40 wt. % or at least 50 wt. % or at least 60 wt. %.

For example, the electrically conductive particles have a resistivity ranging from 0.005 to 400 Ohm·cm at 800° C., preferably ranging from 0.01 to 300 Ohm·cm at 800° C.; more preferably ranging from 0.05 to 150 Ohm·cm at 800° C. and most preferably ranging from 0.1 to 100 Ohm·cm at 800° C.

For example, the electrically conductive particles have a resistivity of at least 0.005 Ohm·cm at 800° C.; preferably of at least 0.01 Ohm·cm at 800° C., more preferably of at least 0.05 Ohm·cm at 800° C.; even more preferably of at least 0.1 Ohm·cm at 800° C., and most preferably of at least 0.5 Ohm·cm at 800° C.

For example, the electrically conductive particles have a resistivity of at most 400 Ohm·cm at 800° C.; preferably of at most 300 Ohm·cm at 800° C., more preferably of at most 200 Ohm·cm at 800° C.; even more preferably of at most 150 Ohm·cm at 800° C., and most preferably of at most 100 Ohm·cm at 800° C.

The selection of the content of electrically conductive particles based on the total weight of the bed and of the electrically conductive particles of a given resistivity influence the temperature reached by the fluidized bed. Thus, in case the targeted temperature is not attained, the person skilled in the art may increase the density of the particle bed, the content of electrically conductive particles based on the total weight of the particles of the bed and/or select electrically conductive particles with a lower resistivity to increase the temperature reach by the fluidized bed.

For example, the density of the solid particles in the bed is expressed as the void fraction. Void fraction or bed porosity is the volume of voids between the particles divided by the total volume of the bed. At the incipient fluidisation velocity, the void fraction is typically between 0.4 and 0.5. The void fraction can increase up to 0.98 in fast fluidised beds with lower values at the bottom of about 0.5 and higher than 0.9 at the top of the bed. The void fraction can be controlled by the linear velocity of the fluidising gas and can be decreased by recycling solid particles that are recovered at the top and send back to the bottom of the fluidized bed, which compensates for the entrainment of solid particles out of the bed.

The void fraction VF is defined as the volume fraction of voids in a bed of particles and is determined according to the following equation:

$$VF = \frac{Vt - Vp}{Vt} \quad (1)$$

wherein Vt is the total volume of the bed and is determined by $$Vt = AH \quad (2)$$

wherein A is the cross-sectional area of the fluidized bed and H is the height of the fluidized bed; and wherein Vp is the total volume of particles within the fluidized bed.

For example, the void fraction of the bed is ranging from 0.5 to 0.8; preferably ranging from 0.5 to 0.7, more preferably from 0.5 to 0.6. To increase the density of the particle bed, the void fraction is to be reduced.

For example, the particles of the bed have an average particle size ranging from 5 to 300 µm as determined by sieving according to ASTM D4513-11, preferably ranging from 10 to 200 µm and more preferably ranging from 20 to 200 µm or from 30 to 150 µm. For example, the electrically conductive particles of the bed have an average particle size ranging from 5 to 300 µm as determined by sieving according to ASTM D4513-11, preferably ranging from 10 to 200 µm and more preferably ranging from 20 to 200 µm or from 30 to 150 µm. For example, the electrically conductive particles of the bed are or comprise one or more selected from one or more non-metallic resistors, one or more metallic carbides, one or more transition metal nitrides, one or more metallic phosphides, one or more superionic conductors, one or more phosphate electrolytes, one or more mixed oxides being doped with one or more lower-valent cations, one or more mixed sulphides being doped with one or more lower-valent cations, and any mixture thereof. With preference, the electrically conductive particles of the bed are or comprise one or more non-metallic resistors, and one or more particles selected from one or more metallic carbides, one or more transition metal nitrides, one or more metallic phosphides, one or more superionic conductors, one or more phosphate electrolytes, one or more mixed oxides being doped with one or more lower-valent cations, one or more mixed sulphides being doped with one or more lower-valent cations, and any mixture thereof.

In an embodiment, from 50 wt. % to 100 wt. % of the electrically conductive particles of the bed based on the total weight of the electrically conductive particles of the bed are one or more particles selected from one or more non-metallic resistors, one or more metallic carbides, one or more transition metal nitrides, one or more metallic phosphides, one or more superionic conductors, one or more phosphate electrolytes, one or more mixed oxides being doped with one or more lower-valent cations, one or more mixed sulphides being doped with one or more lower-valent cations, and any mixture thereof; preferably, from 60 wt. % to 100 wt. %; more preferably from 70 wt. % to 100 wt. %; even more preferably from 80 wt. % to 100 wt. % and most preferably from 90 wt. % to 100 wt. %.

As alternative, the electrically conductive particles of the bed are or comprise one or more particles selected from one or more non-metallic resistors, provided that the non-metallic resistor is not silicon carbide, one or more metallic carbides, one or more transition metal nitrides, one or more metallic phosphides, one or more superionic conductors, one or more phosphate electrolytes, one or more mixed oxides being doped with one or more lower-valent cations and/or one or more mixed sulphides being doped with one or more lower-valent cations and any mixture thereof.

For example, the electrically conductive particles of the bed are or comprise one or more particles selected from one or more non-metallic resistors, one or more mixed oxides being doped with one or more lower-valent cations, one or more mixed sulphides being doped with one or more lower-valent cations, and any mixture thereof.

For example, the electrically conductive particles of the bed are or comprise one or more mixed oxides being doped with one or more lower-valent cations, one or more mixed sulphides being doped with one or more lower-valent cations, and/or any mixture thereof.

For example, the electrically conductive particles of the bed are or comprise one or more selected from one or more non-metallic resistors; with the electrically conductive particles of the bed are or comprise silicon carbide.

For example, a non-metallic resistor is silicon carbide (SiC), molybdenum disilicide ($MoSi_2$), nickel silicide (NiSi), sodium silicide ($Na_2Si$), magnesium silicide ($Mg_2Si$), platinum silicide (PtSi), titanium silicide ($TiSi_2$), tungsten silicide ($WSi_2$) or a mixture thereof, preferably silicon carbide.

For example, a non-metallic resistor is molybdenum disilicide ($MoSi_2$), nickel silicide (NiSi), sodium silicide ($Na_2Si$), magnesium silicide ($Mg_2Si$), platinum silicide (PtSi), titanium silicide ($TiSi_2$), tungsten silicide ($WSi_2$) or a mixture thereof, For example, said one or more metallic carbides are selected from iron carbide ($Fe_3C$), molybdenum carbide (such as a mixture of MoC and $Mo_2C$).

For example, said one or more transition metal nitrides are selected from zirconium nitride (ZrN), tungsten nitride (mixture of $W_2N$, WN, and $WN_2$), vanadium nitride (VN), tantalum nitride (TaN), and/or niobium nitride (NbN).

For example, said one or more metallic phosphides are selected from copper phosphide ($Cu_3P$), indium phosphide (InP), gallium phosphide (GaP), sodium phosphide $Na_3P$), aluminium phosphide (AlP), zinc phosphide ($Zn_3P_2$) and/or calcium phosphide ($Ca_3P_2$).

For example, said one or more superionic conductors are selected from $LiAlSiO_4$, $Li_{10}GeP_2S_{12}$, $Li_{3.6}Si_{0.6}P_{0.4}O_4$, sodium superionic conductors (NaSICON), such as $Na_3Zr_2PSi_2O_{12}$, or sodium beta alumina, such as $NaAl_{11}O_{17}$, $Na_{1.6}Al_{11}O_{17.3}$, and/or $Na_{1.76}Li_{0.38}Al_{10.62}O_{17}$.

For example, said one or more phosphate electrolytes are selected from $LiPO_4$ or $LaPO_4$.

For example, said one or more mixed oxides are ionic or mixed conductors being doped with one or more lower-valent cations. Advantageously, said mixed oxides are doped with one or more lower-valent cations, and are selected from oxides having a cubic fluorite structure, perovskite or pyrochlore.

For example, said one or more mixed sulphides are ionic or mixed conductors being doped with one or more lower-valent cations.

For example, the electrically conductive particles of the bed are or comprise a non-metallic resistor being silicon carbide.

For example, the electrically conductive particles of the bed are or comprise silicon carbide. For example, the silicon carbide is selected from sintered silicon carbide, nitride-bounded silicon carbide, recrystallised silicon carbide, reaction bonded silicon carbide and any mixture thereof. The type of silicon carbide material is selected according to the required heating power necessary for supplying the reaction heat of the steam reforming.

For example, the electrically conductive particles of the bed are or comprise a mixture of a non-metallic resistor being silicon carbide and electrically conductive particles different from said silicon carbide. The presence of electrically conductive particles different from said silicon carbide in the bed is optional. It can be present as a starting material for heating the bed since it was found that the resistivity of silicon carbide at room temperature is too high to start heating the bed. Alternatively to the presence of electrically conductive particles different from silicon carbide, it is possible to provide heat to the reactor for a defined time to start the reaction.

For example, the silicon carbide is selected from sintered silicon carbide, nitride-bounded silicon carbide, recrystalised silicon carbide, reaction bonded silicon carbide and any mixture thereof. The type of silicon carbide material is selected according to the required heating power necessary for supplying the reaction heat of the reaction.

For example, the electrically conductive particles of the bed are or comprise a mixture of a non-metallic resistor being silicon carbide and electrically conductive particles different from said silicon carbide and the electrically conductive particles of the bed comprise from 10 wt. % to 99 wt. % of silicon carbide based on the total weight of the particles of the bed; preferably, from 15 wt. % to 95 wt. %, more preferably from 20 wt. % to 90 wt. %, even more preferably from 25 wt. % to 80 wt. % and most preferably from 30 wt. % to 75 wt. %.

For example, the electrically conductive particles of the bed are or comprise a mixture of a non-metallic resistor being silicon carbide and electrically conductive particles different from said silicon carbide, said electrically conductive particles different from said silicon carbide are one or more mixed oxides being doped with one or more lower-valent cations and/or one or more mixed sulphides being doped with one or more lower-valent cations.

For example, the electrically conductive particles of the bed are or comprise one or more mixed oxides being ionic conductor, namely being doped with one or more lower-valent cations; with preference, the mixed oxides being doped with one or more lower-valent cations are selected from:
  one or more oxides having a cubic fluorite structure being at least partially substituted with one or more lower-valent cations, preferentially selected from Sm, Gd, Y, Sc, Yb, Mg, Ca, La, Dy, Er, Eu; and/or
  one or more $ABO_3$-perovskites with A and B tri-valent cations, being at least partially substituted in A position with one or more lower-valent cations, preferentially selected from Ca, Sr, or Mg, and comprising at least one of Ni, Ga, Co, Cr, Mn, Sc, Fe and/or a mixture thereof in B position; and/or one or more $ABO_3$-perovskites with A bivalent cation and B tetra-valent cation, being at least partially substituted with one or more lower-valent cations, preferentially selected from magnesium (Mg), scandium (Sc), yttrium (Y), neodymium (Nd) or ytterbium (Yb) in the B position or with a mixture of different B elements in the B position; and/or one or more $A_2B_2O_7$-pyrochlore with A trivalent cation and B tetra-valent cation being substituted in A position with one or more lower-valent cation, preferentially selected from Ca or Mg and comprising at least one of Sn, Zr and Ti in B position.

Examples of one or more mixed sulphides are one or more sulphides having a cubic fluorite structure being at least partially substituted with one or more lower-valent cations, preferentially selected from Sm, Gd, Y, Sc, Yb, Mg, Ca, La, Dy, Er, Eu; and/or one or more $ABS_3$ structures with A and B tri-valent cations being at least partially substituted in A position with one or more lower-valent cations, preferably selected from Ca, Sr, or Mg, Sc, and comprising at least one of Ni, Ga, Co, Cr, Mn, Sc, Fe and/or a mixture thereof in B position; and/or one or more $ABS_3$ structures with A bi-valent cation and B tetra-valent cation, being at least partially substituted with one or more lower-valent cations, preferably selected from Mg, Sc, Y, Nd or Yb in the B position or with a mixture of different B elements in the B position; and/or one or more $A_2B_2S_7$ structures with A tri-valent cation and B tetra-valent cation, being at least partially substituted in A position with one or more lower-valent cations, preferably selected from Ca or Mg, and comprising at least one of Sn, Zr and Ti in B position.

With preference, the degree of substitution in the one or more mixed oxides doped with one or more lower-valent cations and having a cubic fluorite structure is between 1 and 15 atom % based on the total number of atoms present in the one or more oxides having a cubic fluorite structure, preferably between 3 and 12 atom %, more preferably between 5 and 10 atom %.

With preference, the degree of substitution in the one or more mixed oxides doped with one or more lower-valent cations is between 1 and 50 atom % based on the total number of atoms present in the one or more $ABO_3$-perovskites with A and B tri-valent cations, in the one or more $ABO_3$-perovskites with A bivalent cation and B tetra-valent cation or in the one or more $A_2B_2O_7$-pyrochlores with A trivalent cation and B tetra-valent cation respectively, preferably between 3 and 20 atom %, more preferably between 5 and 15 atom %.

With preference, the degree of substitution in the one or more mixed sulphides doped with one or more lower-valent cations and having a cubic fluorite structure is between 1 and 15 atom % based on the total number of atoms present in the one or more oxides having a cubic fluorite structure, preferably between 3 and 12 atom %, more preferably between 5 and 10 atom %.

With preference, the degree of substitution in the one or more mixed sulphides doped with one or more lower-valent cations is between 1 and 50 atom % based on the total number of atoms present in the one or more $ABS_3$ structures with A and B tri-valent cations, in the one or more $ABS_3$ structures with A bivalent cation and B tetra-valent cation or in the one or more $A_2B_2S_7$ structures with A trivalent cation and B tetra-valent cation respectively, preferably between 3 and 20 atom %, more preferably between 5 and 15 atom %.

In the case where said electrically conductive particles different from said silicon carbide particles are particles are selected from non-metallic resistors, said non-metallic resistor is preferably molybdenum disilicide ($MoSi_2$).

The Particles of a Catalytic Composition

For example, the content of the particles of a catalytic composition based on the total weight of the particles of the bed is ranging from 30 wt. % to 100 wt. %; preferably from 32 wt. % to 95 wt. %, more preferably from 35 wt. % to 90 wt. %, even more preferably from 37 wt. % to 85 wt. %, most preferably from 40 wt. % to 80 wt. %, even most preferably from 45 wt. % to 75 wt. % or from 50 wt. % to 70 wt. %. In the case where the content of the particles of a catalytic composition based on the total weight of the particles of the bed is 100 wt. %, at least a part of said particles of a catalytic composition are also electrically conductive In an embodiment, particles of a catalytic composition are electrically conductive but are different from the electrically conductive particles of the bed that are selected from one or more non-metallic resistors, one or more metallic carbides, one or more transition metal nitrides, one or more metallic phosphides, one or more superionic conductors, one or more phosphate electrolytes, one or more mixed oxides being doped with one or more lower-valent cations, one or more mixed sulphides being doped with one or more lower-valent cations, and any mixture thereof.

For example, the particles of a catalytic composition have an average particle size ranging from 5 to 300 µm as determined by sieving according to ASTM D4513-11, preferably ranging from 10 to 200 µm and more preferably ranging from 30 to 150 µm.

For example, the catalytic composition comprises one or more transition metals. With preference, said one or more transition metals are selected from Ni, Cu, Co, Mo, Pt, Pd, Rh, Ru and/or Au, more preferably from Ni.

For example, the catalytic composition comprises one or more transition metals in a content ranging between 0.1 and 60.0 wt. % of the total weight of said catalytic composition; preferably between 0.5 and 55.0 wt. %, more preferably between 1.0 and 50.0 wt. %, even more preferably between 3.0 and 45.0 wt. %, most preferably between 5.0 and 40.0 wt. %, even most preferably between 10.0 and 35.0 wt. %.

With preference, the catalytic composition comprises a catalytic support.

Advantageously, said catalytic support is electrically conductive particles; with preference, electrically conductive particles different from said silicon carbide. This allows intimate contact between the catalytic active material and the electrically conductive material.

Advantageously yet, said catalytic support is selected from $Al_2O_3$, $TiO_2$, $ZrO_2$, $HfO_2$, $La_2O_3$, MgO, $CeO_2$, preferably from $Al_2O_3$.

In an embodiment, the catalytic composition is or comprises nickel supported by $Al_2O_3$.

Examples of commercially available catalysts suitable to perform the steam reforming reaction are R-67-7H (Haldor Topsoe), ReforMax LDP (Clariant) and KATALCO™ (Johnson Matthey)

The Endothermic Steam Reforming of Hydrocarbons

For example, the said steam reforming reaction is conducted at a temperature ranging from 550° C. to 1200° C., preferably from 600° C. to 1100° C., more preferably from 650° C. to 1050° C. and most preferably from 700° C. to 1000° C.

For example, the said steam reforming reaction is performed at a pressure ranging between 0.1 MPa and 10.0 MPa, preferably between 0.5 MPa and 5.0 MPa.

In an embodiment, said process comprises a step of pre-heating with a gaseous stream said fluidized bed reactor before conducting said endothermic steam reforming reaction in the fluidized bed reactor; with preference, said gaseous stream is a stream of inert gas and/or has a temperature comprised between 500° C. and 1200° C. The said embodiment is of interest when the electrically conductive particles of the bed have too high resistivity at room temperature to start the electro-heating of the bed.

For example, said endothermic steam reforming of hydrocarbons is performed at a weight hourly space velocity (defined as the ratio of mass flow of reaction stream to the mass of solid particulate material in the fluidized bed) of said reaction stream comprised between 0.1 $h^{-1}$ and 100 $h^{-1}$, preferably comprised between 1.0 $h^{-1}$ and 50 $h^{-1}$, more preferably comprised between 1.5 $h^{-1}$ and 10 $h^{-1}$, even more preferably comprised between 2.0 $h^{-1}$ and 6.0 $h^{-1}$. The weight hourly space velocity is defined as the ratio of mass flow of the reaction stream to the mass of solid particulate material in the fluidized bed.

Thus, depending on the configuration, the fluid stream comprises diluent gases and/or a mixture of hydrocarbon feedstock and steam.

For example, the fluid stream provided in step b) is a mixture of hydrocarbon feedstock and steam.

For example, the said at least two electrodes are made in electrically conductive material; with preference, said at least two electrodes are made in graphite or stainless-steel material or nickel-chromium alloys; or nickel-chromium-iron alloys.

In a preferred embodiment, the outlet temperature of the reactor may range from 800 to 1200° C., preferably from 820 to 1100° C., more preferably from 830 to 950° C., more preferably from 840° C. to 900° C.

In a preferred embodiment, the residence time of the hydrocarbon feedstock in the fluidised bed section of the reactor where the temperature is between 500 and 1200° C., may range from 0.005 to 5.0 seconds, preferably from 0.01 to 2.0 seconds.

The hydrocarbon feedstock for the steam reforming can be at least any hydrocarbon, having one or more carbon atoms. The preferred hydrocarbon is methane or a mixture of light hydrocarbons containing 1 to 5 carbon atoms. The hydrocarbon feedstock can also contain carbon dioxide. Preferably, the hydrocarbon feedstock is natural gas, biogas or refinery gas, each can contain various amounts of carbon dioxide.

For example, the step of heating the fluidized bed is performed by passing an electric current at a voltage of at most 300 V through the fluidized bed, preferably at most 200 V, more preferably at most 150 V, even more preferably at most 120 V, most preferably at most 100 V, even most preferably at most 90 V.

In a preferred embodiment, the steam reforming reaction performed on the hydrocarbon feedstock is done in presence of dilution steam in a molar ratio of 2.0 to 5.0 moles of steam per mole of carbon in the hydrocarbon feedstock, preferably from 2.2 to 4.0, more preferably from 2.5 to 3.0.

For example, wherein the at least one fluidized bed reactor provided in step a) comprises a heating zone and a reaction zone and wherein the fluid stream provided in step b) is provided to the heating zone and comprises diluent gases, the step c) of heating the fluidized bed to a temperature ranging from 500° C. to 1200° C. to conduct the steam reforming reaction of a hydrocarbon feedstock comprises the following sub-steps:

heating the fluidized bed to a temperature ranging from 500° C. to 1200° C. by passing an electric current through the heating zone of the at least one fluidized bed, transporting the heated particles from the heating zone to the reaction zone, in the reaction zone, putting the heated particles in a fluidized state by passing upwardly through the said bed of the reaction zone a fluid stream comprising a hydrocarbon feedstock, steam and optional diluent gases to obtain a fluidized bed and to conduct the steam reforming reaction on the hydrocarbon feedstock, optionally, recovering the particles from the reaction zone and recycling them to the heating zone.

Step c) provides that the steam reforming reaction is performed on a hydrocarbon feedstock which implies that a hydrocarbon feedstock is provided.

For example, wherein the heating zone and the reaction zone are mixed (i.e. the same zone); the fluid stream provided in step b) comprises a hydrocarbon feedstock and steam.

For example, wherein the heating zone and the reaction zone are separated zones, the fluid stream provided in step b) to the heating zone is devoid of a hydrocarbon feedstock. For example, wherein the process comprises providing at least one fluidized bed reactor being a heating zone and at least one fluidized bed reactor being a reaction zone, the fluid stream provided in step b) to the heating zone is devoid of a hydrocarbon feedstock and the fluid stream provided in step b) to the reaction zone comprises a hydrocarbon feedstock.

It is understood that the hydrocarbon feedstock is provided to the reaction zone and that when the heating zone is separated from the reaction zone, no hydrocarbon feedstock is provided to the heating zone. It is understood that in addition to the hydrocarbon feedstock provided to the reaction zone, steam can be provided to the reaction zone to reach the recommended steam to hydrocarbon ratio in the reaction zone as described above.

$CO_2$ Capturing

Advantageously, said process further comprises the following steps:

e) performing a water-gas shift (WGS) reaction (CO+$H_2O \leftrightarrows CO_2 + H_2 + \Delta H°$ 298=−41.09 kJ/mol) onto the carbon monoxide obtained at step (d) with steam to produce a stream comprising carbon dioxide, hydrogen, unconverted carbon monoxide and unconverted hydrocarbons;

f) separating a $CO_2$-enriched stream from said stream comprising carbon dioxide, hydrogen, unconverted carbon monoxide and unconverted hydrocarbons to obtain a $CO_2$-lean stream comprising hydrogen, unconverted carbon monoxide and unconverted hydrocarbons;

g) separating a purified hydrogen stream and a purge stream comprising unrecovered hydrogen, unconverted carbon monoxide and unconverted hydrocarbons from said $CO_2$-lean stream in a pressure swing adsorption (PSA) process;

h) optionally, recovering said 002-enriched stream, said purified hydrogen, and/or mixing said purge stream comprising unrecovered hydrogen, unconverted carbon monoxide and unconverted hydrocarbons with the fluid stream of step (b).

For example, said step (e) is carried out in presence of a water-gas shift catalyst; with preference, said water-gas shift catalyst is selected from copper or iron-based catalyst.

The Installation

According to a second aspect, the disclosure provides an installation to perform endothermic steam reforming reaction on hydrocarbons to produce synthesis gas, according to the first aspect, said installation comprising at least one fluidized bed reactor comprising:
- at least two electrodes, with preference, one electrode is a submerged central electrode or two electrodes are submerged electrodes;
- a reactor vessel;
- one or more fluid nozzles for the introduction of a fluidizing gas and/or of a reaction stream within at least one fluidized bed reactor; and
- a bed comprising particles;

the installation is remarkable in that the particles of the bed comprise electrically conductive particles and particles of a catalytic composition comprising one or more transition metals, wherein at least 10 wt. % of the particles based on the total weight of the particles of the bed are electrically conductive particles, have a resistivity ranging from 0.001 Ohm·cm to 500 Ohm·cm at 800° C. wherein the electrically conductive particles are or comprise one or more particles selected from one or more non-metallic resistors, one or more metallic carbides, one or more transition metal nitrides, one or more metallic phosphides, one or more superionic conductors, one or more phosphate electrolytes, one or more mixed oxides being doped with one or more lower-valent cations, one or more mixed sulphides being doped with one or more lower-valent cations, and any mixture thereof.

In an embodiment, from 50 wt. % to 100 wt. % of the electrically conductive particles of the bed based on the total weight of the electrically conductive particles of the bed are one or more particles selected from one or more non-metallic resistors, one or more metallic carbides, one or more transition metal nitrides, one or more metallic phosphides, one or more superionic conductors, one or more phosphate electrolytes, one or more mixed oxides being doped with one or more lower-valent cations, one or more mixed sulphides being doped with one or more lower-valent cations, and any mixture thereof; preferably, from 60 wt. % to 100 wt. %; more preferably from 70 wt. % to 100 wt. %; even more preferably from 80 wt. % to 100 wt. % and most preferably from 90 wt. % to 100 wt. %.

For example, the fluidizing gas is one or more diluent gases.

For example, the reaction stream comprises a hydrocarbon feedstock and steam.

Advantageously, at least one fluidized bed reactor is devoid of heating means. For example, at least one fluidized bed reactor comprises a reactor vessel and is devoid of heating means located around or inside the reactor vessel. For example, at least one fluidized bed reactor is devoid of heating means selected from ovens, gas burners, hot plates, or any combination thereof. For example, all the fluidized bed reactors are devoid of heating means selected from ovens, gas burners, hot plates, or any combination thereof.

In a preferred embodiment, the at least one fluidized bed reactor comprising at least two electrodes and a bed comprising particles is devoid of packing.

For example, the at least one reactor vessel has an inner diameter of at least 100 cm, preferably at least 200 cm, more preferably at least 300 cm.

With preference, the reactor vessel comprises a reactor wall made of materials that are corrosion-resistant materials and advantageously said reactor wall materials comprise nickel (Ni), SiAlON ceramics, yttria-stabilized zirconia (YSZ), tetragonal polycrystalline zirconia (TZP) and/or tetragonal zirconia polycrystal (TPZ).

For example, the at least one fluidized bed reactor comprises a heating zone and a reaction zone, one or more fluid nozzles to provide a hydrocarbon feedstock to the reaction zone, and means to transport the particles from the heating zone to the reaction zone when necessary and optional means to transport the particles from the reaction zone back to the heating zone. This configuration is remarkable in that a given particle bed is common to more than one fluidized bed reactor. The common bed particle is distributed between at least two reactors and continuously moving from one reactor to another one.

For example, the installation comprises at least two fluidized bed reactors connected one to each other wherein at least one of said at least two fluidized bed reactors is the heating zone and at least another of said at least two fluidized bed reactors is the reaction zone. With preference, the installation comprises one or more fluid nozzles arranged to inject a hydrocarbon feedstock to the at least one fluidized bed reactor being the reaction zone.

For example, the at least one fluidized bed reactor is a single fluidized bed reactor wherein the heating zone is the bottom part of the fluidized bed reactor while the reaction zone is the top part of the fluidised bed reactor. With preference, the installation comprises one or more fluid nozzles to inject a hydrocarbon feedstock between the two zones.

For example, the at least one fluidized bed comprises at least two lateral zones being an outer zone and an inner zone wherein the outer zone is surrounding the inner zone, with the outer zone being the heating zone and the inner zone being the reaction zone. In a less preferred configuration, the outer zone is the reaction zone and the inner zone is the heating zone. With preference, the installation comprises one or more fluid nozzles to inject a hydrocarbon feedstock in the reaction zone.

With preference, one of the electrodes is the reactor vessel or the gas distributor and/or said at least two electrodes are made in stainless steel material or nickel-chromium alloys or nickel-chromium-iron alloys.

For example, the process is according to the first aspect.

The Use of a Particle Bed

According to a third aspect, the disclosure provides the use of a bed comprising particles in at least one fluidized bed reactor to perform a process of steam reforming of hydrocarbons according to the first aspect, the use is remarkable in that the particles of the bed comprise electrically conductive particles and particles of a catalytic composition, wherein at least 10 wt. % of the particles based on the total weight of the particles of the bed are electrically conductive particles, have a resistivity ranging from 0.001 Ohm·cm to 500 Ohm·cm at 800° C. wherein the electrically conductive particles are or comprise one or more particles selected from one or more non-metallic resistors, one or more metallic carbides, one or more transition metal nitrides, one or more metallic phosphides, one or more superionic conductors, one or more phosphate electrolytes, one or more mixed oxides being doped with one or more lower-valent cations, one or more mixed sulphides being doped with one or more lower-valent cations, and any mixture thereof.

In an embodiment, from 50 wt. % to 100 wt. % of the electrically conductive particles of the bed based on the total weight of the electrically conductive particles of the bed are one or more particles selected from one or more non-metallic resistors, one or more metallic carbides, one or more transition metal nitrides, one or more metallic phosphides, one or more superionic conductors, one or more phosphate electrolytes, one or more mixed oxides being doped with one or more lower-valent cations, one or more mixed sulphides being doped with one or more lower-valent cations, and any mixture thereof; preferably, from 60 wt. % to 100 wt. %; more preferably from 70 wt. % to 100 wt. %; even more preferably from 80 wt. % to 100 wt. % and most preferably from 90 wt. % to 100 wt. %.

For example, the use comprises heating the bed comprising particles to a temperature ranging from 500° C. to 1200° C. in a first reactor, transporting the heated particle bed from the first reactor to a second reactor and providing a hydrocarbon feedstock to the second reactor; with preference, at least the second reactor is a fluidized bed reactor and/or at least the second reactor is devoid of heating means; more preferably, the first reactor and the second reactor are fluidized bed reactors and/or the first and the second reactor are devoid of heating means.

In a preferred embodiment, at least one fluidized bed reactor comprising at least two electrodes and a bed comprising particles is devoid of packing.

According to a fourth aspect, the disclosure provides the use of an installation comprising at least one fluidized bed reactor to perform a steam reforming reaction, remarkable in that the installation is according to the second aspect. With preference, the use of an installation at least one fluidized bed reactor to perform a steam reforming reaction in a process according to the first aspect.

The particular features, structures, characteristics or embodiments may be combined in any suitable manner, as would be apparent to a person skilled in the art from this disclosure, in one or more embodiments.

DETAILED DESCRIPTION

Figure 1:
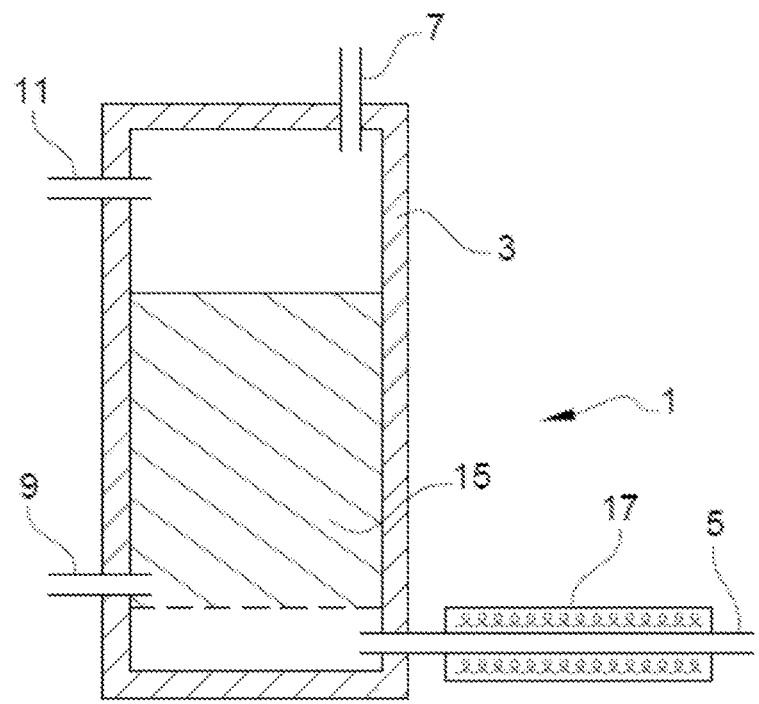
FIG. 1 illustrates an installation according to the prior art.

For the disclosure, the following definitions are given:

The terms "comprising", "comprises" and "comprised of" as used herein are synonymous with "including", "includes" or "containing", "contains", and are inclusive or open-ended and do not exclude additional, non-recited members, elements or method steps. The terms "comprising", "comprises" and "comprised of" also include the term "consisting of".

The recitation of numerical ranges by endpoints includes all integer numbers and, where appropriate, fractions subsumed within that range (e.g., 1 to 5 can include 1, 2, 3, 4, 5 when referring to, for example, a number of elements, and can also include 1.5, 2, 2.75 and 3.80, when referring to, for example, measurements). The recitation of endpoints also includes the recited endpoint values themselves (e.g. from 1.0 to 5.0 includes both 1.0 and 5.0). Any numerical range recited herein is intended to include all sub-ranges subsumed therein.

The present disclosure provides for a process to perform an endothermic steam reforming of hydrocarbons to produce synthesis gas, said process comprising the steps of:
 a) providing at least one fluidized bed reactor comprising at least two electrodes and a bed comprising particles;
 b) putting the particles of the bed in a fluidized state by passing upwardly through the said bed a fluid stream, to obtain a fluidized bed;
 c) heating the fluidized bed to a temperature ranging from 500° C. to 1200° C. to conduct the endothermic steam reforming reaction of a hydrocarbon feedstock in presence of steam;
 d) obtaining a reactor effluent containing hydrogen, carbon monoxide, carbon dioxide and unconverted hydrocarbons and steam;
the process is remarkable in that the particles of the bed comprise electrically conductive particles and particles of a catalytic composition, wherein at least 10 wt. % of the particles based on the total weight of the particles of the bed are electrically conductive particles, have a resistivity ranging from 0.001 Ohm·cm to 500 Ohm·cm at 800° C., and the electrically conductive particles are or comprise one or more particles selected from one or more non-metallic resistors, one or more metallic carbides, one or more transition metal nitrides, one or more metallic phosphides, one or more superionic conductors, one or more phosphate electrolytes, one or more mixed oxides being doped with one or more lower-valent cations, one or more mixed sulphides being doped with one or more lower-valent cations, and any mixture thereof; and in that the step c) of heating the fluidized bed is performed by passing an electric current through the fluidized bed.

In an embodiment, from 50 wt. % to 100 wt. % of the electrically conductive particles of the bed based on the total weight of the electrically conductive particles of the bed are one or more particles selected from one or more non-metallic resistors, one or more metallic carbides, one or more transition metal nitrides, one or more metallic phosphides, one or more superionic conductors, one or more phosphate electrolytes, one or more mixed oxides being doped with one or more lower-valent cations, one or more mixed sulphides being doped with one or more lower-valent cations, and any mixture thereof; preferably, from 60 wt. % to 100 wt. %; more preferably from 70 wt. % to 100 wt. %; even more preferably from 80 wt. % to 100 wt. % and most preferably from 90 wt. % to 100 wt. %.

For example, the step of heating the fluidized bed is performed by passing an electric current at a voltage of at most 300 V through the fluidized bed, preferably at most 200 V, more preferably at most 150 V, even more preferably at most 120 V, most preferably at most 100 V, even most preferably at most 90 V.

For example, the fluid stream provided in step (b) comprises a fluidising gas and/or a reaction stream; with preference, the fluidizing gas is one or more diluent gases; and/or the reaction stream comprises hydrocarbon feedstock and steam.

The solid particulate material (i.e., the particles) in the fluidized bed reactor is typically supported by a porous plate, a perforated plate, a plate with nozzles or chimneys, known as a distributor. The fluid is then forced through the distributor up and travelling through the voids between the solid particulate material. At lower fluid velocities, the solids remain settled as the fluid passes through the voids in the material, known as a packed bed reactor. As the fluid velocity is increased, the particulate solids will reach a stage where the force of the fluid on the solids is enough to counterbalance the weight of the solid particulate material. This stage is known as incipient fluidization and occurs at this minimum fluidization velocity. Once this minimum velocity is surpassed, the contents of the reactor bed begin to expand and become fluidized. Depending on the operating conditions and properties of the solid phase, various flow regimes can be observed in such reactors. The minimum fluidization velocity needed to achieve bed expansion depends upon the size, shape, porosity and density of the particles and the density and viscosity of the upflowing fluid. (P. R. Gunjal, V. V. Ranade, in Industrial Catalytic Processes for Fine and Specialty Chemicals, 2016).

Four different categories of fluidization based on the mean particle have been differentiated by Geldart that determine the fluidization regimes:
- type A, aeratable fluidization (medium size, medium-density particles which are easier to fluidize; Particles of typically 30-100 μm, density ~1500 kg/m$^3$);
- type B, sand-like fluidization (heavier particles which are difficult to fluidize; Particles of typically 100-800 μm, density between 1500 and 4000 kg/m$^3$);
- type C, cohesive fluidization (typical powder-like solid particle fluidization; Fine-size particles (~20 μm) with a dominance of intraparticle or cohesive forces); and
- type D, spoutable fluidization (large density and larger particle ~1-4 mm, dense and spoutable).

Fluidization may be broadly classified into two regimes (Fluid Bed Technology in Materials Processing, 1999 by CRC Press): homogeneous fluidization and heterogeneous fluidization. In homogeneous or particulate fluidization, particles are fluidized uniformly without any distinct voids. In heterogeneous or bubbling fluidization, gas bubbles devoid of solids are distinctly observable. These voids behave like bubbles in gas-liquid flows and exchange gas with the surrounding homogeneous medium with a change in size and shape while rising in the medium. In particulate fluidization, the bed expands smoothly with substantial particle movement and the bed surface is well defined. Particulate fluidization is observed only for Geldart-A type particles. A bubbling fluidization regime is observed at much higher velocities than homogeneous fluidization, in which distinguishable gas bubbles grow from the distributor, may coalesce with other bubbles and eventually burst at the surface of the bed. These bubbles intensify the mixing of solids and gases and bubble sizes tend to increase further with a rise in fluidization velocity. A slugging regime is observed when the bubble diameter increases up to the reactor diameter. In a turbulent regime, bubbles grow and start breaking up with the expansion of the bed. Under these conditions, the top surface of the bed is no longer distinguishable. In fast fluidization or pneumatic fluidization, particles are transported out of the bed and need to be recycled back into the reactor. No distinct bed surface is observed.

Fluidized Bed Reactors have the Following Advantages:
Uniform Particle Mixing: Due to the intrinsic fluid-like behavior of the solid particulate material, fluidized beds do not experience poor mixing as in packed beds. The elimination of radial and axial concentration gradients also allows for better fluid-solid contact, which is essential for reaction efficiency and quality.

Uniform Temperature Gradients: Many chemical reactions require the addition or removal of heat. Local hot or cold spots within the reaction bed are avoided in a fluidized situation.

Ability to Operate Reactor Continuously: The fluidized bed nature of these reactors allows for the ability to continuously withdraw the product(s) and introduce new reactants into the reaction vessel. On top of continuous operation of the chemical reactions, the fluidized bed allows also to continuously, or at a given frequency, withdraw solid material or add continuously or at a given frequency new fresh solid material thanks to the flowable solid particulate material.

Heat can be produced by passing an electrical current through a conducting material that has sufficiently high resistivity (the resistor) to transform electricity into heat. Electrical resistivity (also called specific electrical resistance or volume resistivity, is an intrinsic property independent of shape and size) and its inverse, electrical conductivity, is a fundamental property of a material that quantifies how strongly it resists or conducts electric current (SI unit of electrical resistivity is the ohm-meter (Ω·m) and for conductivity Siemens per meter (S/m)).

When electricity is passed through a fixed bed of electrically conducting particulate solids, having a sufficient resistivity, the bed offers resistance to the flow of current; this resistance depends on many parameters, including the nature of the solid, the nature of the linkages among the particles within the bed, the bed voidage, the bed height, the electrode geometry, etc. If the same fixed bed is fluidized by passing gas, the resistance of the bed increases; the resistance offered by the conducting particles generates heat within the bed and can maintain the bed in isothermal conditions (termed an electrothermal fluidized bed or electrofluid reactor). In many high-temperature reactions, electrofluid reactors offer in situ heating during the reaction and are particularly useful for operating endothermic reactions and hence save energy because no external heating or transfer of heat is required.

It is a prerequisite that at least part of the solid particulate material is electrically conducting but non-conducting solid particulates can be mixed and still result in enough heat generation. Such non-conducting or very high resistivity solids can play a catalytic role in the chemical conversion. The characteristics of the bed material determine the resistance of an electrothermal fluidized bed furnace; as this is a charge resistor type of heat generation, the specific resistivity of the particles affects the bed resistance. The size, shape, composition, and size distribution of the particles also influence the magnitude of the bed resistance. Also, when the bed is fluidized, the voids generated between the particles increases the bed resistance. The total resistance of the bed is the sum of two components, e.g. the electrode contact-resistance (i.e., the resistance between the electrode and the bed) and the bed resistance. A large contact-resistance will cause extensive local heating in the vicinity of the electrode while the rest of the bed stays rather cool.

The following factors determine the contact-resistance: current density, fluidization velocity, type of bed material, electrode size and the type of material used for the electrodes. The electrode compositions can be advantageously metallic like iron, cast iron or other steel alloys, copper or a copper-based alloy, nickel or a nickel-based alloy or refractory like metal, intermetallics or an alloy of Zr, Hf, V, Nb, Ta, Cr, Mo, W or ceramic-like carbides, nitrides or carbon-based like graphite. The area of contact between the bed material and the electrodes can be adjusted, depending on the electrode submergence and the amount of particulate material in the fluidized bed. Hence, the electrical resistance and the power level can be manipulated by adjusting these variables. Advantageously, to prevent overheating of the electrodes compared to the fluidised bed, the resistivity of the electrode should be lower (and hence the joule heating) than of the particulate material of the fluidized bed. In a preferred embodiment, the electrodes can be cooled by passing a colder fluid inside or outside the electrodes. Such fluids can be any liquid that vaporises upon a heating, gas stream or can be a part of the colder feedstock that first cools the electrode before entering the fluidised bed.

Bed resistance can be predicted by the ohmic law. The mechanism of current transfer in fluidized beds is believed to occur through current flow along continuous chains of conducting particles at low operating voltages. At high voltages, a current transfer occurs through a combination of chains of conducting particles and arcing between the electrode and the bed as well as particle-to-particle arcing that might ionize the gas, thereby bringing down the bed resistance. Arcing inside the bed, in principle, is not desirable as it would lower the electrical and thermal efficiency. The gas velocity impacts strongly the bed resistance, a sharp increase in resistance from the settled bed onward when the gas flow rate is increased; a maximum occurred close to the incipient fluidization velocity, followed by a decrease at higher velocities. At gas flow rates sufficient to initiate slugging, the resistance again increased. Particle size and shape impact resistance as they influence the contacts points between particles. In general, the bed resistivity increases 2 to 5 times from a settled bed (e.g. 20 Ohm·cm for graphite) to the incipient fluidisation (60 Ohm·cm for graphite) and 10 to 40 times from a settled bed to twice (300 Ohm·cm for graphite) the incipient fluidisation velocity. Non or less-conducting particles can be added to conducting particles. If the conducting solid fraction is small, the resistivity of the bed would increase due to the breaking of the linkages in the chain of conducting solids between the electrodes. If the non-conducting solid fraction is finer in size, it would fill up the interstitial gaps or voidage of the larger conducting solids and hence increase the resistance of the bed.

In general, for a desired high heating power, a high current at a low voltage is preferred. The power source can be either AC or DC. Voltages applied in an electrothermal fluidized bed are typically below 100 V to reach enough heating power. The electrothermal fluidized bed can be controlled in the following three ways:

1. Adjusting the gas flow: Because the conductivity of the bed depends on the extent of voidage or gas bubbles inside the bed, any variation in the gas flow rate would change the power level; hence the temperature can be controlled by adjusting the fluidizing gas flow rate. The flow rate required for optimum performance corresponds to a velocity which equals or slightly exceeds the minimum fluidization velocity.
2. Adjusting the electrode submergence: The power level can also be controlled by varying the electrode immersion level inside the bed because the conductivity of the bed is dependent on the area of contact between the conducting particles and the electrode: the surface area of the electrode available for current flow increases with electrode submergence, leading to a reduction in overall resistance.
3. Adjusting the applied voltage: although changing the power level by using the first two methods is often more affordable or economical than increasing the applied voltage, however in electrothermal fluidized beds three variables are available to control the produced heating power.

The wall of the reactor is generally made of graphite, ceramics (like SiC), high-melting metals or alloys as it is versatile and compatible with many high-temperature reactions of industrial interest. The atmosphere for the reaction is often restricted to the neutral or the reducing type as an oxidising atmosphere can combust carbon materials or create a non-conducting metal oxide layer on top of metals or alloys. The wall and/or the distribution plate itself can act as an electrode for the reactor. The fluidized solids can be graphite, carbon, or any other high-melting-point, electrically conducting particles. The other electrodes, which is usually immersed in the bed, can also be graphite or a high-melting-point metal, intermetallics or alloys.

It may be advantaged to generate the required reaction heat by heating the conductive particles and/or catalyst particles in a separate zone of the reactor where little or substantially no feedstock hydrocarbons are present, but only diluent gases. The benefit is that the appropriate conditions of fluidization to generate heat by passing an electrical current through a bed of conductive particles can be optimized whereas the optimal reaction conditions during hydrocarbon transformation can be selected for the other zone of the reactor. Such conditions of optimal void fraction and linear velocity might be different for heating purposes and chemical transformation purposes.

In an embodiment of the present disclosure, the installation comprises of two zones arranged in series namely a first zone being a heating zone and a second zone being a reaction zone, where the conductive particles and catalyst particles are continuously moved or transported from the first zone to the second zone and vice versa. The first and second zones can be different parts of a fluidized bed or can be located in separate fluidized beds reactors connected to each other.

In the said embodiment, the process to perform a steam reforming reaction of hydrocarbon to produce synthesis gas said process comprising the steps of:
 a) providing at least one fluidized bed reactor comprising at least two electrodes and a bed comprising particles;
 b) putting the particles in a fluidized state by passing upwardly through the said bed a fluid stream, to obtain a fluidized bed;
 c) heating the fluidized bed to a temperature ranging from 500° C. to 1200° C. to conduct the endothermic steam reforming reaction of a hydrocarbon feedstock in presence of steam; and
 d) obtaining a reactor effluent containing hydrogen ($H_2$), carbon monoxide (CO), carbon dioxide ($CO_2$) and unconverted hydrocarbons and steam;
wherein the particles of the bed comprise electrically conductive particles and particles of a catalytic composition, wherein at least 10 wt. % of the particles based on the total weight of the particles of the bed are electrically conductive particles, have a resistivity ranging from 0.001 Ohm·cm to 500 Ohm·cm at 800° C., wherein the electrically conductive particles are or comprise one or more particles selected from one or more non-metallic resistors, one or more metallic carbides, one or more transition metal nitrides, one or more metallic phosphides, one or more superionic conductors, one or more phosphate electrolytes, one or more mixed oxides being doped with one or more lower-valent cations, one or more mixed sulphides being doped with one or more lower-valent cations, and any mixture thereof, wherein the at least one fluidized bed reactor provided in step a) comprises a heating zone and a reaction zone and wherein the fluid stream provided in step b) is provided to the heating zone and comprises diluent gases and the step c) of heating the fluidized bed to a temperature ranging from 500° C. to 1200° C. to conduct the steam reforming reaction of a hydrocarbon feedstock in presence of steam comprises the following sub-steps:

heating the fluidized bed to a temperature ranging from 500° C. to 1200° C. by passing an electric current through the heating zone of the at least one fluidized bed, transporting the heated particles from the heating zone to the reaction zone, in the reaction zone, putting the heated particles in a fluidized state by passing upwardly through the said bed of the reaction zone a fluid stream comprising a hydrocarbon feedstock, steam and optional diluent gases to obtain a fluidized bed and to conduct the endothermic steam reforming reaction on the hydrocarbon feedstock, optionally, recovering the particles from the reaction zone and recycling them to the heating zone.

For example, from 50 wt. % to 100 wt. % of the electrically conductive particles of the bed based on the total weight of the electrically conductive particles of the bed are one or more particles selected from one or more non-metallic resistors, one or more metallic carbides, one or more transition metal nitrides, one or more metallic phosphides, one or more superionic conductors, one or more phosphate electrolytes, one or more mixed oxides being doped with one or more lower-valent cations, one or more mixed sulphides being doped with one or more lower-valent cations, and any mixture thereof; preferably, from 60 wt. % to 100 wt. %; more preferably from 70 wt. % to 100 wt. %; even more preferably from 80 wt. % to 100 wt. % and most preferably from 90 wt. % to 100 wt. %.

For example, the diluent gases can be one or more selected from steam, hydrogen, carbon dioxide, argon, helium, and nitrogen.

For example, the at least one fluidized bed reactor is at least two fluidized bed reactors connected one to each other wherein at least one of said at least two fluidized bed reactors is the heating zone and at least another of said at least two fluidized bed reactors is the reaction zone. With preference, the at least one fluidized bed reactor being the heating zone comprises gravitational or pneumatic transport means to transport the particles from the heating zone to the reaction zone and/or the installation comprises means arranged to inject a hydrocarbon feedstock to the at least one fluidized bed reactor being the reaction zone. The installation is devoid of means to inject a hydrocarbon feedstock to the at least one fluidized bed reactor being the heating zone.

For example, the at least one fluidized bed reactor is a single fluidized bed reactor wherein the heating zone is the bottom part of the fluidized bed reactor while the reaction zone is the top part of the fluidised bed reactor. With preference, the installation comprises means to inject a hydrocarbon feedstock and/or diluent between the two zones. The diameter of the heating zone and reaction zone can be different to accomplish optimum conditions for heating in the bottom zone and optimum conditions for hydrocarbon conversion in the top zone. Particles can move from the heating zone to the reaction zone by entrainment and the other way around from the reaction zone back to the heating zone by gravity. Optionally, particles can be collected from the upper heating zone and transferred by a separate transfer line back to the bottom heating zone. Step c) provides that the steam reforming reaction is performed on a hydrocarbon feedstock and steam which implies that both a hydrocarbon feedstock and steam are provided. It is understood that the hydrocarbon feedstock is provided to the reaction zone and that when the heating zone is separated from the reaction zone then, with preference, no hydrocarbon feedstock is provided to the heating zone. When the heating zone and the reaction zone are mixed (i.e. the same zone); the fluid stream provided in step b) comprises a hydrocarbon feedstock.

It is a specific embodiment of the present disclosure that the distance between the heat sources, being the hot particulate material and the feedstock is significantly reduced because of the small size of the particulates and the mixing of the particulates in the vaporous fluidising stream, compared to steam reformer tubes having typically 2.5 to 25 cm internal diameter requiring large temperature gradients to concur the large distance that heat has to travel.

In a preferred embodiment, the volumetric heat generation rate is greater than 0.1 MW/m$^3$ of fluidized bed, more preferably greater than 1 MW/m$^3$, in particular, greater than 3 MW/m$^3$.

The Bed Comprising Particles

According to the disclosure, the particles of the bed comprise electrically conductive particles and catalytic particles. For example, the catalytic particles are electrically conductive. For example, the electrically conductive particles are a mixture of catalytic particles and non-catalytic particles.

According to the disclosure the particles of the bed comprises at least 10 wt. % of electrically conductive particles based on the total weight of the particles of the bed.

For example, the content of electrically conductive particles based on the total weight of the bed is ranging from 10 wt. % to 100 wt. %; preferably, from 15 wt. % to 95 wt. %, more preferably from 20 wt. % to 90 wt. %, even more preferably from 25 wt. % to 80 wt. % and most preferably from 30 wt. % to 75 wt. %.

For example, the content of electrically conductive particles based on the total weight of the bed is at least 12 wt. % based on the total weight of the particles of the bed; preferably, at least 15 wt. %, more preferably, at least 20 wt. %; even more preferably at least 25 wt. %, and most preferably at least 30 wt. % or at least 40 wt. % or at least 50 wt. % or at least 60 wt. %.

For example, the content of electrically conductive particles based on the total weight of the bed is at most 75 wt. % based on the total weight of the particles of the bed; preferably, at most 80 wt. %, more preferably at most 85 wt. %; even more preferably at most 90 wt. %, and most preferably at most 95 wt. % or at most 98 wt. % or is 100 wt. %.

To achieve the required temperature necessary to carry out the steam reforming reaction, at least 10 wt. % of the particles based on the total weight of the particles of the bed are electrically conductive and have a resistivity ranging from 0.001 Ohm·cm to 500 Ohm·cm at 800° C.

For example, the electrically conductive particles have a resistivity ranging from 0.005 to 400 Ohm·cm at 800° C., preferably ranging from 0.01 to 300 Ohm·cm at 800° C.; more preferably ranging from 0.05 to 150 Ohm·cm at 800° C. and most preferably ranging from 0.1 to 100 Ohm·cm at 800° C.

For example, the electrically conductive particles have a resistivity of at least 0.005 Ohm·cm at 800° C.; preferably of at least 0.01 Ohm·cm at 800° C., more preferably of at least 0.05 Ohm·cm at 800° C.; even more preferably of at least 0.1 Ohm·cm at 800° C., and most preferably of at least 0.5 Ohm·cm at 800° C.

For example, the electrically conductive particles have a resistivity of at most 400 Ohm·cm at 800° C.; preferably of at most 300 Ohm·cm at 800° C., more preferably of at most 200 Ohm·cm at 800° C.; even more preferably of at most 150 Ohm·cm at 800° C., and most preferably of at most 100 Ohm·cm at 800° C.

For example, the particles of the bed have an average particle size ranging from 5 to 300 μm as determined by sieving according to ASTM D4513-11, preferably ranging from 10 to 200 μm and more preferably ranging from 20 to 200 μm or from 30 to 150 μm.

For example, the electrically conductive particles of the bed have an average particle size ranging from 5 to 300 μm as determined by sieving according to ASTM D4513-11, preferably ranging from 10 to 200 μm and more preferably ranging from 20 to 200 μm or from 30 to 150 μm.

Determination by sieving according to ASTM D4513-11 is preferred. In case the particles have an average size of below 20 μm the determination of the average size can also be done by Laser Light Scattering according to ASTM D4464-15.

For example, the particles of a catalytic composition have an average particle size ranging from 5 to 300 μm as determined by sieving according to ASTM D4513-11, preferably ranging from 10 to 200 μm and more preferably ranging from 20 to 200 μm or from 30 to 150 μm.

The electrical resistance is measured by a four-probe DC method using an ohmmeter. A densified power sample is shaped in a cylindrical pellet that is placed between the probe electrodes. Resistivity is determined from the measured resistance value, R, by applying the known expression $\rho = Rx\ A/L$, where L is the distance between the probe electrodes typically a few millimetres and A the electrode area.

The solid particulate material can exhibit electronic, ionic or mixed electronic-ionic conductivity. The ionic bonding of many refractory compounds allows for ionic diffusion and correspondingly, under the influence of an electric field and appropriate temperature conditions, ionic conduction.

The electrical conductivity, σ, the proportionality constant between the current density j and the electric field E, is given by $$\sigma = j/E = \Sigma c_i \times Z_i q \times \mu_i$$

where $c_i$ is the carrier density (number=cm³), $\mu_i$ the mobility (cm²/Vs), and $Z^i q$ the charge ($q = 1.6 \times 10^{-19}$ C) of the ith charge carrier. The many orders of magnitude differences in between metals, semiconductors and insulators generally result from differences in c rather than μ. On the other hand, the higher conductivities of electronic versus ionic conductors are generally due to the much higher mobilities of electronic versus ionic species.

The most common materials that can be used for resistive heating can be subdivided into seven groups:

(1) non-metallic resistors like silicon carbide (SiC), molybdenum disilicide ($MoSi_2$) nickel silicide (NiSi), sodium silicide ($Na_2Si$), magnesium silicide ($Mg_2Si$), platinum silicide (PtSi), titanium silicide ($TiSi_2$) and tungsten silicide ($WSi_2$) up to 1600-1900° C., (2) several mixed oxides and/or mixed sulphides being doped with one or more lower-valent cation with variable temperature optima, (3) metallic carbides,
(4) transition metal nitrides,
(5) metallic phosphides,
(6) superionic conductors and
(7) phosphate electrolytes.

Many mixed oxides being doped with one or more lower-valent cations, having in general too high resistivity at low temperature, become ionic or mixed conductors at high temperature. The following circumstances can make oxides sufficient conductors for heating purposes: ionic conduction in solids is described in terms of the creation and motion of atomic defects, notably vacancies and interstitials of which its creation and mobility is very positively dependent on temperature. Such mixed oxides are ionic conductors, namely being doped with one or more lower-valent cations. Three mechanisms for ionic defect formation in oxides are known: (1) Thermally induced intrinsic ionic disorder (such as Schottky and Frenkel defect pairs resulting in non-stoichiometry), (2). Redox-induced defects and (3) Impurity-induced defects. The first two categories of defects are predicted from statistical thermodynamics and the latter form to satisfy electroneutrality. In the latter case, high charge carrier densities can be induced by substituting lower valent cations for the host cations. Mixed oxides and/or mixed sulphides with fluorite, pyrochlore or perovskite structure are very suitable for substitution by one or more lower-valent cations.

Several sublattice disordered oxides or sulphides have high ion transport ability at increasing temperature. These are superionic conductors, such as $LiAlSiO_4$, $Li_{10}GeP_2S_{12}$, $L_{i3-\delta}Si_{0.6}P_{0-4}O_4$, NaSICON (sodium (Na) Super Ionic CONductor) with the general formula $Na_{1+x}Zr_2P_{3-x}Si_xO_{12}$ with 0<x<3, for example $Na_3Zr_2PSi_2O_{12}$ (x=2), or sodium beta alumina, such as $NaAl_{11}O_{17}$, $Na_{1-\delta}Al_{11}O_{17.3}$, and/or $Na_{1-76}Li_{0-38}Al_{10-62}O_{17}$.

High concentrations of ionic carriers can be induced in intrinsically insulating solids and creating high defective solids. Thus, the electrically conductive particles of the bed are or comprise one or more mixed oxides being ionic conductors, namely being doped with one or more lower-valent cations. With preference, the mixed oxides are selected from one or more oxides having a cubic fluorite structure being at least partially substituted with one or more lower-valent cations, preferentially selected from Sm, Gd, Y, Sc, Yb, Mg, Ca, La, Dy, Er, Eu; and/or from one or more $ABO_3$-perovskites with A and B tri-valent cations, being at least partially substituted in A position with one or more lower-valent cations, preferentially selected from Ca, Sr, or Mg, and comprising at least one of Ni, Ga, Co, Cr, Mn, Sc, Fe and/or a mixture thereof in B position; and/or from one or more $ABO_3$-perovskites with A bivalent cation and B tetra-valent cation, being at least partially substituted with one or more lower-valent cations, preferentially selected from Mg, Sc, Y, Nd or Yb in the B position or with a mixture of different B elements in the B position; and/or from one or more $A_2B_2O_7$-pyrochlores with A trivalent cation and B tetra-valent cation being at least partially substituted in A position with one or more lower-valent cations, preferentially selected from Ca or Mg, and comprising at least one of Sn, Zr and Ti in B position.

With preference, the one or more mixed sulphides are selected from one or more sulphides having a cubic fluorite structure being at least partially substituted with one or more lower-valent cations, preferentially selected from Sm, Gd, Y, Sc, Yb, Mg, Ca, La, Dy, Er, Eu; and/or from one or more $ABS_3$ structures with A and B tri-valent cations, being at least partially substituted in A position with one or more lower-valent cations, preferentially selected from Ca, Sr, or Mg, and comprising at least one of Ni, Ga, Co, Cr, Mn, Sc, Fe and/or a mixture thereof in B position; and/or from one or more $ABS_3$ structures with A bivalent cation and B tetra-valent cation, being at least partially substituted with one or more lower-valent cations, preferentially selected from Mg, Sc, Y, Nd or Yb in the B position or with a mixture of different B elements in the B position; and/or from one or more $A_2B_2S_7$ structures with A trivalent cation and B tetra-valent cation being at least partially substituted in A position with one or more lower-valent cations, preferentially selected from Ca or Mg, and comprising at least one of Sn, Zr and Ti in B position.

With preference, the degree of substitution in the one or more mixed oxides doped with one or more lower-valent cations and having a cubic fluorite structure is between 1 and 15 atom % based on the total number of atoms present in the one or more oxides having a cubic fluorite structure, preferably between 3 and 12 atom %, more preferably between 5 and 10 atom %.

With preference, the degree of substitution in the one or more mixed oxides doped with one or more lower-valent cations is between 1 and 50 atom % based on the total number of atoms present in the one or more $ABO_3$-perovskites with A and B tri-valent cations, in the one or more $ABO_3$-perovskites with A bivalent cation and B tetra-valent cation or in the one or more $A_2B_2O_7$-pyrochlores with A trivalent cation and B tetra-valent cation respectively, preferably between 3 and 20 atom %, more preferably between 5 and 15 atom %.

With preference, the degree of substitution in the one or more mixed sulphides doped with one or more lower-valent cations and having a cubic fluorite structure is between 1 and 15 atom % based on the total number of atoms present in the one or more oxides having a cubic fluorite structure, preferably between 3 and 12 atom %, more preferably between 5 and 10 atom %.

With preference, the degree of substitution in the one or mixed sulphides doped with one or more lower-valent cations is between 1 and 50 atom % based on the total number of atoms present in the one or more $ABS_3$ structures with A and B tri-valent cations, in the one or more $ABS_3$ structures with A bivalent cation and B tetra-valent cation or in the one or more $A_2B_2S_7$ structures with A trivalent cation and B tetra-valent cation respectively, preferably between 3 and 20 atom %, more preferably between 5 and 15 atom %.

Said one or more oxides having a cubic fluorite structure, said one or more $ABO_3$-perovskites with A and B tri-valent cations, said one or more $ABO_3$-perovskites with A bivalent cation and B tetra-valent cation or said one or more $A_2B_2O_7$-pyrochlores with A trivalent cation and B tetra-valent cation being at least partially substituted with lower valent cations, said one or more sulphides having a cubic fluorite structure, said one or more $ABS_3$ structures with A and B tri-valent cations, said one or more $ABS_3$ structures with A bivalent cation and B tetra-valent cation, said one or more $A_2B_2S_7$ structures with A trivalent cation and B tetra-valent cation being at least partially substituted with lower valent cations also means that the same element, being a high-valent cation, can be reduced in the lower-valent equivalent, for example, Ti(IV) can be reduced in Ti(III) and/or Co(III) can be reduced in Co(II) and/or Fe(III) can be reduced in Fe(II) and/or Cu(II) can be reduced in Cu(I).

Phosphate electrolytes such as $LiPO_4$ or $LaPO_4$ can also be used as electrically conductive particles.

Metallic carbides, transition metal nitrides and metallic phosphides can also be selected as electrically conductive particles. For example, metallic carbides are selected from iron carbide ($Fe_3C$), molybdenum carbide (mixture of MoC and $Mo_2C$). For example, said one or more transition metal nitrides are selected from zirconium nitride (ZrN), tungsten nitride (mixture of $W_2N$, WN, and $WN_2$), vanadium nitride (VN), tantalum nitride (TaN), and/or niobium nitride (NbN). For example, said one or more metallic phosphides are selected from copper phosphide ($Cu_3P$), indium phosphide (InP), gallium phosphide (GaP), sodium phosphide $Na_3P$), aluminium phosphide (AlP), zinc phosphide ($Zn_3P_2$) and/or calcium phosphide ($Ca_3P_2$).

For example, the electrically conductive particles of the bed are or comprise silicon carbide. For example, at least 10 wt. % of the electrically conductive particles based on the total weight of the particles of the bed are silicon carbide particles and have a resistivity ranging from 0.001 Ohm·cm to 500 Ohm·cm at of 800° C.

In the embodiment wherein the electrically conductive particles of the bed are or comprise silicon carbide, the person skilled in the art will have the advantage to conduct a step of pre-heating with a gaseous stream said fluidized bed reactor before conducting said endothermic reaction in the fluidized bed reactor. Advantageously, the gaseous stream is a stream of inert gas, i.e., nitrogen, argon, helium, methane, carbon dioxide or steam. The temperature of the gaseous stream can be at least 500° C., or at least 550° C., or at least 600° C., or at least 650° C., or at least 700° C., or at least 750° C., or at least 800° C., or at least 850° C., or at least 900° C. Advantageously, the temperature of the gaseous stream can be comprised between 500° C. and 900° C., for example between 600° C. and 800° C. or between 650° C. and 750° C. Said gaseous stream of inert gas can also be used as the fluidification gas. The pre-heating of the said gaseous stream of inert gas is performed thanks to conventional means, including using electrical energy. The temperature of the gaseous stream used for the preheating of the bed doesn't need to reach the temperature reaction.

Indeed, the resistivity of silicon carbide at ambient temperature is high, to ease the starting of the reaction, it may be useful to heat the fluidized bed by external means, as with preference the fluidized bed reactor is devoid of heating means. Once the bed is heated at the desired temperature, the use of a hot gaseous stream may not be necessary.

However, in an embodiment, the electrically conductive particles of the bed are or comprise a mixture of silicon carbide particles and electrically conductive particles different from silicon carbide particles.

The pre-heating step may be also used in the case wherein electrically conductive particles different from silicon carbide particles are present in the bed. For example, it may be used when the content of silicon carbide in the electrically conductive particles of the bed is more than 80 wt. % based on the total weight of the electrically conductive particles of the bed, for example, more than 85 wt. %, for example, more than 90 wt. %, for example, more than 95 wt. %, for example, more than 98 wt. %, for example, more than 99 wt. %. However, a pre-heating step may be used whatever is the content of silicon carbide particles in the bed.

In the embodiment wherein the electrically conductive particles of the bed are or comprise a mixture of silicon carbide particles and electrically conductive particles different from silicon carbide particles, the electrically conductive particles of the bed may comprise from 10 wt. % to 99 wt. % of silicon carbide particles based on the total weight of the electrically conductive particles of the bed; preferably, from 15 wt. % to 95 wt. %, more preferably from 20 wt. % to 90 wt. %, even more preferably from 25 wt. % to 80 wt. % and most preferably from 30 wt. % to 75 wt. %.

For example, the electrically conductive particles of the bed are or comprise a mixture of silicon carbide particles and electrically conductive particles different from silicon carbide particles and the electrically conductive particles of the bed comprise at least 40 wt. % of silicon carbide particles based on the total weight of the electrically conductive particles of the bed; preferably at least 50 wt. %, more preferably at least 60 wt. %, even more preferably at least 70 wt. % and most preferably at least 80 wt. %.

In an embodiment, the electrically conductive particles of the bed may comprise from 10 wt. % to 90 wt. % of electrically conductive particles different from silicon carbide particles based on the total weight of the electrically conductive particles of the bed; preferably, from 15 wt. % to 95 wt. %, more preferably from 20 wt. % to 90 wt. %, even more preferably from 25 wt. % to 80 wt. % and most preferably from 30 wt. % to 75 wt. %.

However, it may be interesting to keep the content of electrically conductive particles different from silicon carbide particles quite low in the mixture. Thus, in an embodiment, the electrically conductive particles of the bed are or comprise a mixture of silicon carbide particles and electrically conductive particles different from silicon carbide particles and electrically conductive particles of the bed comprise from 1 wt. % to 20 wt. % of electrically conductive particles different from silicon carbide based on the total weight of the electrically conductive particles of the bed; preferably, from 2 wt. % to 15 wt. %, more preferably, from 3 wt. % to 10 wt. %, and even more preferably, from 4 wt. % to 8 wt. %.

The presence of electrically conductive particles different from silicon carbide particles in the bed allows applying the process according to the disclosure with or without the pre-heating step, preferably without the pre-heating step. Indeed, the electrically conductive particles, upon the electrification of the fluidized bed reactor, will heat up and because of their fluidification, will contribute to raising and/or maintaining the desired temperature within the reactor.

The Silicon Carbide Particles

For example, the silicon carbide is selected from sintered silicon carbide, nitride-bounded silicon carbide, recrystallised silicon carbide, reaction bonded silicon carbide and any mixture thereof.

Sintered SiC (SSiC) is a self-bonded material containing a sintering aid (typically boron) of less than 1% by weight.

Recrystallized silicon carbide (RSiC), a high purity SiC material sintered by the process of evaporation—condensation without any additives.

Nitride-bonded silicon carbide (NBSC) is made by adding fine silicon powder with silicon carbide particles or eventually in the presence of a mineral additive and sintering in a nitrogen furnace. The silicon carbide is bonded by the silicon nitride phase ($Si_3N_4$) formed during nitriding.

Reaction bonded silicon carbide (RBSC), also known as siliconized silicon carbide or SiSiC, is a type of silicon carbide that is manufactured by a chemical reaction between porous carbon or graphite with molten silicon. The silicon reacts with the carbon forming silicon carbide and bonds the silicon carbide particles. Any excess silicon fills the remaining pores in the body and produces a dense SiC—Si composite. Due to the left-over traces of silicon, reaction bonded silicon carbide is often referred to as siliconized silicon carbide. The process is known variously as reaction bonding, reaction sintering, self-bonding, or melt infiltration.

In general, high purity SiC particles have a resistivity above 1000 Ohm·cm, whereas sintered, reaction bonded and nitride-bonded can exhibit resistivities of about 100 to 1000 depending on the impurities in the SiC phase. Electrical resistivity of bulk polycrystalline SiC ceramics shows a wide range of resistivity depending on the sintering additive and heat-treatment conditions (Journal of the European Ceramic Society, Volume 35, Issue 15, December 2015, Pages 4137; Ceramics International, Volume 46, Issue 4, March 2020, Pages 5454). SiC polytypes with high purity possess high electrical resistivity (>106 Ω·cm) because of their large bandgap energies. However, the electrical resistivity of SiC is affected by doping impurities. N and P act as n-type dopants and decrease the resistivity of SiC, whereas Al, B, Ga, and Sc act as p-type dopants. SiC doped with Be, O, and V are highly insulating. N is considered the most efficient dopant for improving the electrical conductivity of SiC. For N doping of SiC (to decrease resistivity) $Y_2O_3$ and $Y_2O_3$-$REM_2O_3$(REM=rare earth metal=Sm, Gd, Lu) have been used as sintering additives for the efficient growth of conductive SiC grains containing N donors. N-doping in SiC grains was promoted by the addition of nitrides (AlN, BN, $Si_3N_4$, TiN, and ZrN) or combinations of nitrides and $REEM_2O_3$ (AlN— $REM_2O_3$ (REM=Sc, Nd, Eu, Gd, Ho, and Er) or TiN—$Y_2O_3$).

The Catalytic Composition

The steam reforming catalyst comprises a catalytic composition that advantageously comprises one or more transition metals. For example, the steam reforming catalyst is preferably a Cu, Co, Mo, Ni catalyst or a precious metal catalyst, or a combination thereof. Suitable catalysts comprise 10-60 wt. % Co, Ni or Cu combined with a support. Precious metal catalysts such as Pt, Pd, Rh, Au or Ru are dispersed on a suitable support and with metal loadings of typically 0.1-5.0 wt. %. Catalysts comprising one or more of Ni, Co, Pt and Rh are preferred. Suitable particulate catalyst supports are refractory oxides such as alumina ($Al_2O_3$), titania ($TiO_2$), zirconia ($ZrO_2$), hafnia ($HfO_2$), lanthania ($La_2O_3$), magnesia (MgO), ceria ($CeO_2$), preferably zirconia stabilized with magnesia, lanthania, yttria ($Y_2O_3$) or ceria; metal-aluminates such as calcium aluminate and magnesium aluminate; and mixtures thereof. Particularly preferred particulate catalyst supports comprise alumina and/or stabilized zirconia, e.g. lanthania-stabilized alumina, ceria-zirconia-alumina, ceria-titania-alumina and ceria-magnesia-alumina materials. Preferred support materials are those common materials (mentioned above) that can be used for resistive heating at the same time such as non-metallic resistors like silicon carbide (SiC) and molybdenum disilicide ($MoSi_2$), several mixed oxides with variable temperature optima and carbons like graphite. This latter option results in intimate contact between the catalytic active metal and the resistor particulate material.

The particulate catalyst support particles preferably have a particle size of from 5 to 300 μm, more preferably between 10 and 200 μm and most preferably between 30 and 150 μm. Metal contents on the support may be in the range 0.1-60.0 wt. %. Due to their different activities, preferably the precious metals such as Pt, Pd, Rh, Ru and Au are present in an amount in the range 0.1-5.0 wt. %, and the Co, Mo, Ni or Cu present in an amount in the range of 10.0-60.0 wt. %. The catalytic metal or metal precursors may be dispersed over the surface of the particulate catalyst support by conventional impregnation of soluble metal compounds onto the particulate catalyst support followed by drying and calcination to convert the catalytic metal compound or compounds to their respective oxides. Alternatively, the catalytic metal or metal precursors may be dispersed over the surface of the particulate catalyst support material by precipitation, using metals sols or by deposition-precipitation methods employing metal salts that deposit insoluble metal compounds on the particulate catalyst support from solution upon heating. Further, metal salts can be ion-exchanged with counter cations on the support material. The metal precursors are reduced into the metallic state at elevated temperature by using hydrogen, carbon monoxide or hydrocarbons as reductants. This can be done before loading the catalyst in the fluidised bed reactor or in situ in the fluidised bed before feeding the feedstock or during feeding the feedstock.

An example of a suitable catalyst for the steam reforming reaction can be a metal-containing-MFI zeolite (i.e., a Mo-containing MFI zeolite) used in combination with a conductive material used for resistive heating.

The Installation

The terms "bottom" and "top" are to be understood in relation to the general orientation of the installation or the fluidized bed reactor. Thus, "bottom" will mean greater ground proximity than "top" along the vertical axis. In the different figures, the same references designate identical or similar elements.

FIG. 1 illustrates a prior art fluidized bed reactor 1 comprising a reactor vessel 3, a bottom fluid nozzle 5 for the introduction of a fluidizing gas and a hydrocarbon feedstock, an optional inlet 7 for the material loading, an optional outlet 9 for the material discharge and a gas outlet 11 and a bed 15. In the fluidized bed reactor 1 of FIG. 1 the heat is provided by preheating the feedstock by combustion of fossil fuels using heating means 17 arranged for example at the level of the line that provides the reactor with the fluidizing gas and the hydrocarbon feedstock.

The installation of the present disclosure is now described with reference to FIGS. 2 to 5. For sake of simplicity, internal devices are known by the person in the art that are used in fluidized bed reactors, like bubble breakers, deflectors, particle termination devices, cyclones, ceramic wall coatings, thermocouples, etc. . . . are not shown in the illustrations.

Figure 2:
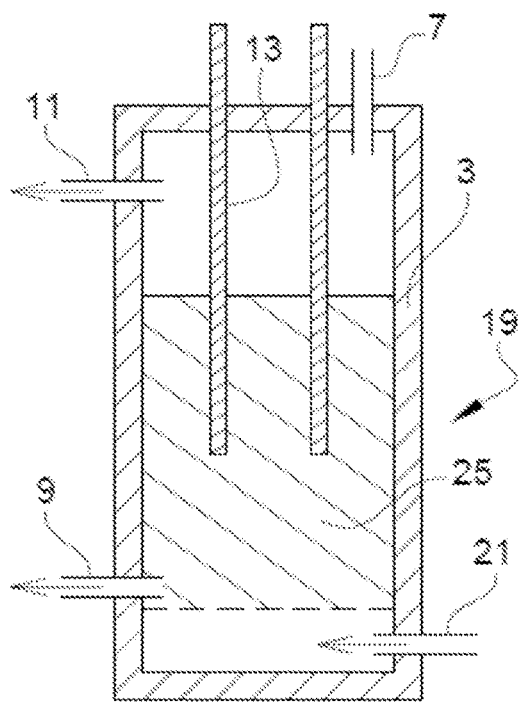
FIG. 2 illustrates an installation according to the disclosure with one reactor wherein the heating zone and reaction zone are the same.

FIG. 2 illustrates a first installation with a fluidized bed reactor 19 where the heating and reaction zone are the same. The fluidized bed reactor 19 comprises a reactor vessel 3, a bottom fluid nozzle 21 for the introduction of a fluidizing gas and a hydrocarbon feedstock, an optional inlet 7 for the material loading, an optional outlet 9 for the material discharge and a gas outlet 11. The fluidized bed reactor 1 of FIG. 19 shows two electrodes 13 submerged in bed 25.

Figure 3:
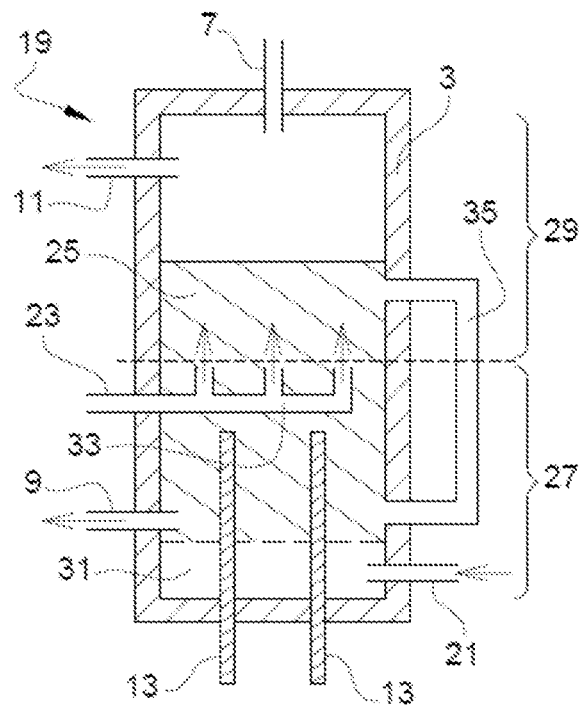
FIG. 3 illustrates an installation according to the disclosure with one reactor wherein the heating zone and reaction zone are arranged one above the other.

FIG. 3 illustrates an embodiment wherein at least one fluidized bed reactor 19 comprises a heating zone 27 and a reaction zone 29 with the heating zone 27 is the bottom zone and the reaction zone 29 is on top of the heating zone 27. One or more fluid nozzles 23 to provide a hydrocarbon feedstock to the reaction zone from a distributor 33. As it can be seen in FIG. 3, the one or more fluid nozzles 23 can be connected to a distributor 33 to distribute the hydrocarbon feedstock inside bed 25.

Figure 4:
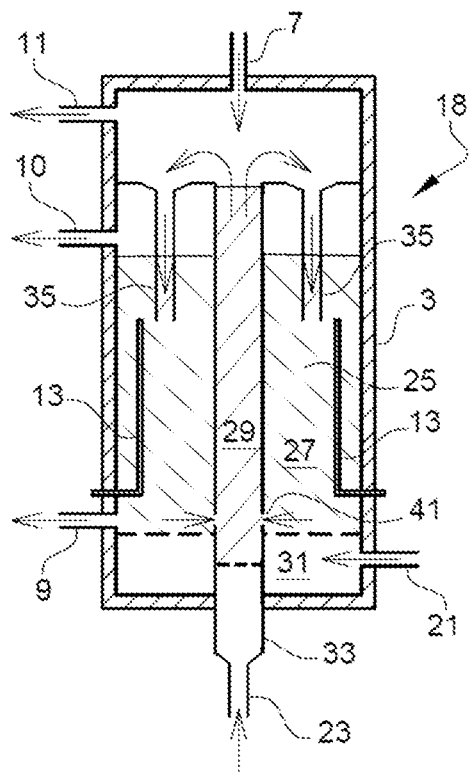
FIG. 4 illustrates an installation according to the disclosure with one reactor wherein the heating zone and reaction zone are arranged one lateral to the other.

FIG. 4 illustrates an installation wherein at least one fluidized bed reactor 18 comprises at least two lateral zones with the outer zone being the heating zone 27 and the inner zone being the reaction zone 29. The heated particles of bed 25 from the outer zone are transferred to the inner zone by one or more openings 41 and mixed with the hydrocarbon feedstock and/or steam. At the end of the reaction zone, the particles are separated from the reaction product and transferred to the heating zone.

Figure 5:
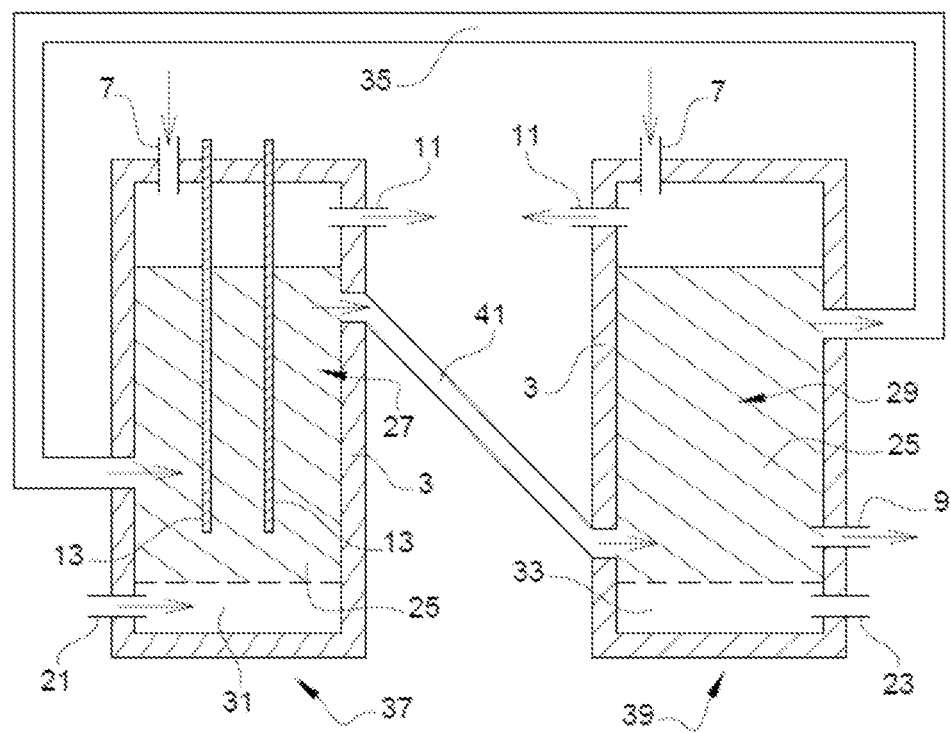
FIG. 5 illustrates an installation according to the disclosure with two reactors.

FIG. 5 illustrates the installation that comprises at least two fluidized bed reactors (37, 39) connected one to each other wherein at least one fluidized bed reactor is the heating zone 27 and one at least one fluidized bed reactor is the reaction zone 29.

The present disclosure provides for an installation to be used in a process to perform steam reforming reaction on hydrocarbons to produce synthesis gas, according to the first aspect, said installation comprising at least one fluidized bed reactor (18, 19, 3, 39) comprising:
at least two electrodes 13
a reactor vessel 3;
one or more fluid nozzles (21; 23) for the introduction of a fluidizing gas and/or of a reaction stream within at least one fluidized bed reactor; and
a bed 25 comprising particles;
the fluidized bed reactor is remarkable in that the particles of the bed comprise electrically conductive particles and particles of a catalytic composition, wherein at least 10 wt. % of the particles based on the total weight of the particles of the bed are electrically conductive particles and have a resistivity ranging from 0.001 Ohm·cm to 500 Ohm·cm at 800° C. wherein the electrically conductive particles are or comprise one or more particles selected from one or more non-metallic resistors, one or more metallic carbides, one or more transition metal nitrides, one or more metallic phosphides, one or more superionic conductors, one or more phosphate electrolytes, one or more mixed oxides being doped with one or more lower-valent cations, one or more mixed sulphides being doped with one or more lower-valent cations, and any mixture thereof.

For example, one electrode is a submerged central electrode or two electrodes 13 are submerged within the reactor vessel 3 of at least one reactor (18, 19, 37).

For example, all the fluidized bed reactors are devoid of heating means. When stating that at least one of the fluidized bed reactors is devoid of "heating means", it refers to "classical" heating means, such as ovens, gas burners, hot plates and the like. There are no other heating means than the at least two electrodes of the fluidized bed reactor itself. For example, at least one fluidized bed reactor is devoid of heating means selected from ovens, gas burners, hot plates, or any combination thereof. For example, all the fluidized bed reactors are devoid of heating means selected from ovens, gas burners, hot plates, or any combination thereof.

In a preferred embodiment, the at least one fluidized bed reactor comprising at least two electrodes and a bed comprising particles is devoid of packing.

For example, fluidizing gas is one or more diluent gases. For example, the reaction stream comprises a hydrocarbon feedstock and steam.

For example, reactor vessel 3 has an inner diameter of at least 100 cm, or at least 200 cm; or at least 400 cm. Such a large diameter allows to carry out the chemical reaction at an industrial scale, for example at a weight hourly space velocity of said reaction stream comprised between $0.1\ h^{-1}$ and $100\ h^{-1}$, preferably comprised between $1.0\ h^{-1}$ and $50\ h^{-1}$, more preferably comprised between $1.5\ h^{-1}$ and $10^{h-1}$, even more preferably comprised between $2.0\ h^{-1}$ and $6.0\ h^{-1}$. The weight hourly space velocity is defined as the ratio of mass flow of the reaction stream to the mass of solid particulate material in the fluidized bed.

The at least one fluidized bed reactor (18, 19, 37) comprises at least two electrodes 13. One electrode is in electrical connection with the outer wall of the fluidized bed reactor, while one additional electrode is submerged into the fluidized bed 25, or both electrodes 13 are submerged into the fluidized bed 25. Said at least two electrodes 13 are electrically connected and can be connected to a power supply (not shown). It is advantageous that said at least two electrodes 13 are made of carbon-containing material. The person skilled in the art will have an advantage that the electrodes 13 are more conductive than the particle bed 25.

For example, at least one electrode 13 is made of or comprises graphite; preferably, all or the two electrodes 13 are made of graphite. For example, one of the electrodes is the reactor vessel, so that the reactor comprises two electrodes, one being the submerged central electrode and one being the reactor vessel 3.

For example, at least one fluidized bed reactor comprises at least one cooling device arranged to cool at least one electrode.

During use of the at least one fluidized bed reactor, an electric potential of at most 300 V is applied; preferably of at most 250 V; more preferably of at most 200 V, even more preferably at most 150 V, most preferably at most 100 V, even most preferably at most 90 V, or at most 80 V.

Thanks to the fact that the power of the electric current can be tuned, it is easy to adjust the temperature within the reactor bed.

Reactor vessel 3 can be made of graphite. In an embodiment, it can be made of electro-resistive material that is silicon carbide or a mixture of silicon carbide and one or more electrically conductive materials.

With preference, reactor vessel 3 comprises reactor wall made of materials which are corrosion-resistant materials and advantageously said reactor wall materials comprise nickel (Ni), SiAlON ceramics, yttria-stabilized zirconia (YSZ), tetragonal polycrystalline zirconia (TZP) and/or tetragonal zirconia polycrystal (TPZ). SiAlON ceramics are ceramics based on the elements silicon (Si), aluminium (Al), oxygen (O) and nitrogen (N). They are solid solutions of silicon nitride ($Si_3N_4$), where Si—N bonds are partly replaced with Al—N and Al—O bonds.

For example, reactor vessel 3 is made of an electro-resistive material that is a mixture of silicon carbide and one or more electrically conductive materials; and the electro-resistive material of the reactor vessel 3 comprises from 10 wt. % to 99 wt. % of silicon carbide based on the total weight of the electro-resistive material; preferably, from 15 wt. % to 95 wt. %, more preferably from 20 wt. % to 90 wt. %, even more preferably from 25 wt. % to 80 wt. % and most preferably from 30 wt. % to 75 wt. %.

For example, reactor vessel 3 is made of an electro-resistive material that is a mixture of silicon carbide and one or more carbon-containing materials; and the one or more carbon-containing materials are selected from graphite, carbon black, coke, petroleum coke and any mixture thereof; with preference, the carbon-containing material is or comprises graphite.

For example, reactor vessel 3 is not conductive. For example, reactor vessel 3 is made of ceramic.

For example, the at least one fluidized bed reactor (18, 19, 37, 39) comprises a heating zone 27 and a reaction zone 29, one or more fluid nozzles 21 to provide a fluidizing gas to at least the heating zone from a distributor 31, one or more fluid nozzles 23 to provide a hydrocarbon feedstock to the reaction zone, and means 41 to transport the particles from the heating zone 27 to the reaction zone 29 when necessary, and optional means 35 to transport the particles from the reaction zone 29 back to the heating zone 27.

For example, as illustrated in FIG. 3, the at least one fluidized bed reactor is a single one fluidized bed reactor 19 wherein the heating zone 27 is the bottom part of the fluidized bed reactor 19 while the reaction zone 29 is the top part of the fluidised bed reactor 19; with preference, the installation comprises one or more fluid nozzles 23 to inject a hydrocarbon feedstock between the two zones (27, 29) or in the reaction zone 29. The fluidized bed reactor 19 further comprises optionally an inlet 7 for the material loading, optionally an outlet 9 for the material discharge and a gas outlet 11. With preference, the fluidized bed reactor 19 is devoid of heating means. For example, electrodes 13 are arranged at the bottom part of the fluidized bed reactor 19, i.e. in the heating zone 27. For example, the top part of the fluidised bed reactor 19, i.e. the reaction zone 29, is devoid of electrodes. Optionally, the fluidized bed reactor 19 comprises means 35 to transport the particles from the reaction zone 29 back to the heating zone 27; such as by means of a line arranged between the top part and the bottom part of the fluidized bed reactor 19.

For example, as illustrated in FIG. 4, the installation comprises at least two lateral fluidized bed zones (27, 29) connected one to each other wherein at least one fluidized bed zone 27 is the heating zone and at least one fluidized bed zone 29 is the reaction zone. For example, heating zone 27 is surrounding reaction zone 29. With preference, the installation comprises one or more fluid nozzles 23 arranged to inject a hydrocarbon feedstock and/or steam to the at least one reaction zone 29 by means of a distributor 33. The fluidized bed zones (27, 29) further comprise optionally an inlet 7 for the material loading and a gas outlet 11. With preference, the at least one fluidized bed zone being the heating zone 27 and/or the at least one fluidized bed zone being the reaction zone 29 is devoid of heating means. For example, the at least one fluidized bed zone being the reaction zone 29 shows optionally an outlet 9 for the material discharge. One or more fluid nozzles 21 provide a fluidizing gas to at least the heating zone from a distributor 31. With one or more inlet devices 41, heated particles are transported from the heating zone 27 to the reaction zone 29, and with one or more means 35 comprising downcomers, the separated particles are transported from the reaction zone 29 back to the heating zone 27. The fluidization gas for the heating zone 27 can be an inert diluent, like one or more selected from steam, hydrogen, carbon dioxide, argon, helium, and nitrogen. In such a configuration the fluidization gas for the heating zone can also comprise air or oxygen to burn deposited coke from the particles.

For example, as illustrated in FIG. 5, the installation comprises at least two fluidized bed reactors (37, 39) connected one to each other wherein at least one fluidized bed reactor 37 is the heating zone 27 and at least one fluidized bed reactor 39 is the reaction zone 29. With preference, the installation comprises one or more fluid nozzles 23 arranged to inject a hydrocarbon feedstock and/or steam to the at least one fluidized bed reactor 39 being the reaction zone 29. The fluidized bed reactors (37, 39) further comprise optionally an inlet 7 for the material loading and a gas outlet 11. With preference, the at least one fluidized bed reactor 37 being the heating zone 27 and/or the at least one fluidized bed reactor 39 being the reaction zone 29 is devoid of heating means. For example, the at least one fluidized bed reactor 39 being the reaction zone 29 shows optionally an outlet 9 for the material discharge. Using the inlet device 41 heated particles are transported from the heating zone 27 to the reaction zone 29 when necessary, and using device 35 the separated particles after the reaction zone are transported from the reaction zone back to the heating zone. The fluidization gas for the heating zone can be an inert diluent, like one or more selected from steam, hydrogen, carbon dioxide, argon, helium, and nitrogen. In such a configuration the fluidization gas for the heating zone can also comprise air or oxygen to burn deposited coke from the particles.

For example, the at least one fluidized bed reactor 37 being the heating zone 27 comprises at least two electrodes 13 whereas the at least one fluidized bed reactor 39 being the reaction zone 29 is devoid of electrodes.

For example, the at least two fluidized bed reactors (37, 39) are connected one to each other by means 41 suitable to transport the particles from the heating zone 27 to the reaction zone 29, such as one or more lines.

For example, the at least two fluidized bed reactors (37, 39) are connected one to each other by means 35 suitable to transport the particles from the reaction zone 29 back to the heating zone 27, such as one or more lines.

The Steam Reforming Reaction

The hydrocarbon stream, to be fed to the reformer, is advantageously vaporized in a vaporizer, which advantageously may be heated using heat contained in the reactor effluent. Before steam reforming, the feed gas stream can be preferably desulfurized, to prevent poisoning of the metal catalyst. For this purpose, the feed gas stream is passed through a desulfurization reactor containing ZnO as a catalyst, in which $H_2S$ is converted to ZnS and $H_2O$ at temperatures of 300 to 400° C. The feed gas stream substantially free of sulfur subsequently is mixed with steam, the gas-steam mixture is preheated to a temperature of 300 to 700° C., preferably 560 to 650° C. The steam may be added to the vaporized hydrocarbon stream by direct injection or by use of a saturator. The steam/carbon (carbon atoms in the hydrocarbons) molar ratio in the combined reformer feedstock can be controlled to avoid carbon deposition on the catalyst and slip of methane (incomplete conversion of methane) and is typically in the range of from 0.15 to 5.0, more preferable between 0.3 to 4, even more preferable between 1.0 to 3.0. Subsequently, the gas-steam mixture is heated to a temperature of 700 to 1200° C. at pressures above 1 MPa by passing through the electrothermal fluidised bed reformer vessel containing the reforming catalyst. The gas stream leaving the fluidised bed reactor contains $H_2$, CO, $CO_2$, unconverted steam and hydrocarbons as well as possibly inert gas constituents of the feed gas stream.

The steam reforming reaction is normally carried out at temperatures of from 500 to 1200° C., pressures of from 1 to 8 MPa and in presence of dilution steam in a molar ratio of 2 to 5 mole of steam per mole of carbon in the hydrocarbon feedstock, preferably from 2.0 to 4.0, more preferably in a ratio from 2.5 to 2.8. High conversion is favoured by high temperature, low pressure and high S/C ratio (which also limits carbon deposition). Low S/C ratio is preferred from an energy efficiency and typical S/C ratios below 2.5 are often used.

It is a preferred embodiment of the present disclosure to add carbon dioxide either to the hydrocarbon stream or to the steam stream in a $CO_2$ to carbon (carbon atoms in the hydrocarbons) molar ratio in the combined reformer feedstock from 0.05 to 1, more preferably from 0.1 to 0.75, even more preferably from 0.2 to 0.3.

It is a preferred embodiment of the present disclosure that solid materials that exhibit only sufficiently low resistivity at high temperature to be heated by external means before reaching the high enough temperature where resistive heating with electricity overtakes or by mixing with a sufficiently low resistivity solid at a low temperature so that the combined resulting resistivity allows to heat the fluidized bed to the desired reaction temperature.

It is a preferred embodiment of the present disclosure to combine the electrothermal fluidised bed steam reformer with a pre-reformer before in case the hydrocarbon feedstock contains more than 5 wt. % of hydrocarbons having two or more carbons or with an autothermal reformer behind or a combination of heat-exchanger reformer and an autothermal reformer behind. In such cases, the required reaction heat is supplied either by electrical heating or internal combustion (partial oxidation).

It is a preferred embodiment of the present disclosure to withdraw continuously or intermittently solid particulate material and particulate catalyst, containing carbonaceous depositions, from the electrothermal fluidised bed vessel, transporting it to a fluidised bed regeneration vessel, burning the carbonaceous depositions with a stream containing oxygen and optionally carbon dioxide and/or steam, transporting the at least partially regenerated solid particulate material and particulate catalyst back into the electrothermal fluidised bed reformer vessel. Optionally the combustion products, carbon monoxide, carbon dioxide and steam are injected in the main electrothermal fluidized bed reformer.

It is a preferred embodiment of the present disclosure to recover the sensible and latent heat in the produced synthesis gas to preheat the steam reformer feedstock (both the hydrocarbons and steam).

The residence time of the hydrocarbon feedstock in the fluidised bed section of the reactor where the temperature is between 500 and 1200° C., may advantageously range from 0.005 to 5.0 seconds, preferably from 0.01 to 2.0 seconds, more preferably from 0.1 to 1.0 seconds. It is however possible to regenerate the catalyst in the case where coke would be deposited.

$CO_2$ Capturing

Advantageously, said process further comprises the following steps:
e) performing a water-gas shift (WGS) reaction (CO+ $H_2O \leftrightarrows CO_2+H_2$ $\Delta H° 298=-41.09$ kJ/mol) onto the carbon monoxide obtained at step (d) with steam to produce a stream comprising carbon dioxide, hydrogen, unconverted carbon monoxide and unconverted hydrocarbons;
f) separating a $CO_2$-enriched stream from said stream comprising carbon dioxide, hydrogen, unconverted carbon monoxide and unconverted hydrocarbons to obtain a $CO_2$-lean stream comprising hydrogen, unconverted carbon monoxide and unconverted hydrocarbons;
g) separating a purified hydrogen stream and a purge stream comprising unrecovered hydrogen, unconverted carbon monoxide and unconverted hydrocarbons from said 002-lean stream in a pressure swing adsorption (PSA) process;
h) optionally, recovering said 002-enriched stream, said purified hydrogen, and/or mixing said purge stream comprising unrecovered hydrogen, unconverted carbon monoxide and unconverted hydrocarbons with the fluid stream of step (b).

The water-gas shift reaction is advantageously detailed in "*The water-gas shift reaction: from conventional catalytic systems to Pd-based membrane reactors—a review*" from Mendes D. et al. (Asia-Pacific *J. Chem. Engineering*, 2010, 5, 111-137) and in "*Performance of water-gas shift reaction catalysts: A review*" from Pal D. B. et al. (*Renewable and Sustainable Energy Reviews*, 2018, 93, 549-565).

For example, said step (e) is carried out in presence of a water-gas shift catalyst; with preference, said water-gas shift catalyst is selected from copper or iron-based catalyst.

This reaction is moderately exothermic and its equilibrium constant decreases with increasing temperature. The reaction is favored thermodynamically at lower temperatures and kinetically at elevated temperatures but is unaffected by changes in pressure. WGS processes can be operated at high temperature (HTS) or low temperature (LTS) or combinations of both depending on the remaining desired CO in the product.

The HTS catalysts generally operate in the temperature range of from 310 to 450° C. and are called ferrochrome catalysts, containing both iron and chromium. The inlet temperature is kept as low as possible at about 350° C. to prevent excessive temperature rise in the reactor, a maximum outlet temperature of about 550° C. is pursued. The typical composition of HTS catalyst is reportedly about 70 to 75% $Fe_2O_3$, about 5 to 15% $Cr_2O_3$ and some alkali or alkaline earth oxides. $Cr_2O_3$ acts as a stabilizer and prevents the sintering of $Fe_2O_3$. The outlet concentration of a conventional Fe/Cr HTS WGS reactor can be as low as 3% CO, being the equilibrium concentration at 450° C.

The low temperature shift (LTS) reaction occurs at 200-250° C. using catalysts comprising a mixture of CuO, ZnO, $Cr_2O_3$ and $Al_2O_3$. The typical compositions of such catalysts are 20-75% ZnO, 15 to 35% CuO, 5 to 15% $Cr_2O_3$, 1-5% Mn, Al and magnesium oxides as balance. Copper metal crystallites are the active species in the catalyst. ZnO and $Cr_2O_3$ provide the structural support for the catalyst and $Al_2O_3$ is the carrier providing the surface area for dispersion and mechanical strength of the catalyst particles. The WGS reaction is traditionally conducted in two- or three-stage catalytic converters to allow smaller adiabatic temperature rise and better steam management. The first stage is characterized by working at higher temperatures, favouring fast CO consumption and minimizing catalyst bed volume. In the following stages, the reaction takes place at progressively lower temperatures for obtaining higher conversions, which are limited by the reaction equilibrium. Interstage cooling systems are used to conduct the next WGS reaction at a lower temperature, favouring the approach to equilibrium conversions.

The pressure for WGS can vary between 1 and 6 MPa for HTS and between 1 and 4 MPa for LTS.

Said step (f) of separating a $CO_2$-enriched stream from said stream comprising carbon dioxide, hydrogen, unconverted carbon monoxide and unconverted hydrocarbons is advantageously performed by treating the stream comprising carbon dioxide, hydrogen, unconverted carbon monoxide and unconverted hydrocarbons obtained at step (e) in separation processes for hydrogen production with $CO_2$ capture, such as adsorption, absorption, membranes and cryogenic/low-temperature processes. See study entitled "*Hydrogen production with $CO_2$ capture*" from Voldsund M. et al. (*International Journal of Hydrogen Energy*, 2016, 4969-4992).

Pressure swing adsorption (PSA) is the currently most used technology for hydrogen purification with the possibility to obtain very pure hydrogen (Pressure swing adsorption technology for hydrogen production, K. Liu, C. Song, V. Subramani (Eds.), Hydrogen and syngas production and purification technologies (2010), p. 414).

In a PSA unit, the syngas is sent through an adsorbent column at high pressure, where impurities are adsorbed while hydrogen passes through with very limited adsorption. When the adsorbent is saturated, it is regenerated by lowering the pressure and purging. Typical adsorbents include silica gel, alumina, activated carbon, and zeolite, and they have different relative strengths of adsorption to different components. PSA units are typically operated at ambient temperature (adsorption is promoted at low temperature) and feed pressure of 2 to 6 MPa. The hydrogen product is produced at a slightly lower pressure than the feed due to pressure drop and the PSA off-gas is delivered at low pressure, typically 0.1 to 0.3 MPa. In standard plants without $CO_2$ capture, the $CO_2$-rich off-gas is often used as fuel due to the content of combustible components. Such $CO_2$-rich off-gas is not suitable for the transport and storage of $CO_2$.

Adsorption can be used to capture and purify $CO_2$ from other gases with a $CO_2$ selective adsorbent (U.S. Pat. No. 4,171,206; Purification of hydrogen by pressure swing adsorption, Sep Sci Technol, 35 (5) (2000), pp. 667; $CO_2$ capture from SMRs: a demonstration project Hydrocarbon Process (September) (2012), pp. 63). This process comprises two purification steps: first adsorbent beds with activated carbon selectively removes wet $CO_2$, before adsorbent beds with zeolites remove $CH_4$, CO, $N_2$, and the remaining $CO_2$ from the hydrogen. Optionally the first pressure swing adsorption is a vacuum swing adsorption unit (VSA) that captures wet $CO_2$, between the already existing SMR and PSA units. Most (>90%) of the $CO_2$ is captured with purity greater than 97% (after compression and drying) from syngas.

Gas separation by absorption is carried out by bringing the gas in contact with a liquid solvent in a scrubber column, where the acid gases are dissolved. The rich solvent is sent to a regeneration/stripping column where it is heated and/or depressurised and which produces an overhead stream with the desorbed components, and one with a lean solvent that is sent back to the scrubber column. Liquid solvents can be divided into chemical and physical solvents. Chemical solvents react with $CO_2$ ($CO_2$ being a weak acid reacts with a base) and require a considerable amount of heat for regeneration. They offer fast reaction rates and hence small plant sizes. Typical chemical solvents are aqueous solutions of amines such as MEA, TEA and MDEA, or an aqueous solution of hot potassium carbonate (eg. the Benfield process). Physical solvents dissolve $CO_2$ and are regenerated with reduced pressure and/or increased temperature, requiring less heat than chemical solvents. Typical technologies utilising physical solvents are the Rectisol®, Selexol™, and Purisol® technologies.

The absorption capacity of chemical solvents is relatively high at low $CO_2$ partial pressures. The absorption capacity of physical solvents is lower than for chemical solvents at low $CO_2$ partial pressures but increases linearly with $CO_2$ partial pressure according to Henry's law. Chemical solvents are therefore preferred at low $CO_2$ partial pressures while physical solvents are preferred at high $CO_2$ partial pressures.

Membranes are selective barriers that let certain components pass through more easily than others (The part of the feed that passes through the membrane is the permeate while the part that does not pass through is denoted retentate). The transport of molecules through the membrane is driven by a difference in partial pressures over the membrane.

For hydrogen production with $CO_2$ capture, both hydrogen and $CO_2$ selective membranes can be used. Hydrogen selective membranes produce a permeate consisting of high-purity hydrogen at low pressure, and a retentate with impure $CO_2$ at higher pressure. $CO_2$ selective membranes typically produce a $CO_2$ enriched permeate at low pressure, and a $CO_2$ depleted retentate at high pressure. The hydrogen-selective membranes operating at low temperatures below 100° C. are polymeric membranes and are been used for hydrogen recovery from low-temperature process streams. High-temperature hydrogen-selective membranes can be divided into metallic membranes (300-700° C.), microporous ceramic membranes (200-600° C.), porous carbon membranes (500-900° C.) and dense ceramic membranes (600-900° C.). Their high-temperature operation makes them more applicable for steam reformer/water-gas shift processes. Several $CO_2$ membrane types exist: polymeric $CO_2$ selective membranes based on either solution-diffusion mechanism (the solution effect must dominate over diffusion), or facilitated transport mechanism; mixed matrix membranes, which consist of inorganic particles dispersed uniformly in a polymer matrix; and porous inorganic membranes that are $CO_2$ selective either by surface diffusion or capillary condensation. In cryogenic or low-temperature separation gas is cooled, and differences in boiling point are used to separate different chemical components. For separation of hydrogen, the gas mixture is cooled to cryogenic temperatures 150° C.). Contaminant gases are condensed at different temperature levels, while hydrogen remains in the gas phase. For separation of $CO_2$, the gas mixture is cooled below the boiling point of $CO_2$ at the given pressure (above the $CO_2$ triple point at 5.2 bar and −56.6° C.), and the $CO_2$ is condensed from lighter gaseous. An advantage of low-temperature separation is that the captured $CO_2$ is in the liquid state and can be pressurized for transport by pumping at a low energy cost.

Said step (g) of is the step of separating a purified hydrogen stream and a purge stream comprising unrecovered hydrogen, unconverted carbon monoxide and unconverted hydrocarbons from said 002-lean stream in a pressure swing adsorption (PSA) process. In such a PSA unit, the gas is sent through an adsorbent column at high pressure, where impurities are adsorbed while hydrogen passes through with very limited adsorption. When the adsorbent is saturated, it is regenerated by lowering the pressure and purging. Typical adsorbents include silica gel, alumina, activated carbon, and zeolite, and they have different relative strengths of adsorption to different components. PSA units are typically operated at ambient temperature (adsorption is promoted at low temperature) and feed pressure of 2 to 6 MPa. The hydrogen product is produced at a slightly lower pressure than the feed due to pressure drop and the PSA off-gas is delivered at low pressure, typically 0.1 to 0.3 MPa.

The invention claimed is:

1. A process to perform an endothermic steam reforming of hydrocarbons to produce synthesis gas, said process comprising the steps of:
  a) providing at least one fluidized bed reactor comprising at least two electrodes and a bed comprising particles;
  b) putting the particles of the bed in a fluidized state by passing upwardly through said bed a fluid stream, to obtain a fluidized bed;
  c) heating the fluidized bed to a temperature ranging from 700° C. to 1200° C. to conduct the endothermic steam reforming reaction of a hydrocarbon feedstock in presence of steam;
  d) obtaining a reactor effluent containing hydrogen, carbon monoxide, carbon dioxide and unconverted hydrocarbons and steam;
  the process is characterized in that the particles of the bed comprise electrically conductive particles and particles of a catalytic composition, wherein at least 10 wt. % of the particles based on the total weight of the particles of the bed are electrically conductive particles, have a resistivity ranging from 0.001 Ohm·cm to 500 Ohm·cm at 800° C.; in that from 50 wt. % to 100 wt. % of the electrically conductive particles of the bed based on the total weight of the electrically conductive particles of the bed are or comprise one or more particles selected from the group consisting of one or more non-metallic resistors, one or more metallic carbides, one or more transition metal nitrides, one or more metallic phosphides, one or more superionic conductors, one or more phosphate electrolytes, one or more mixed oxides being doped with one or more lower-valent cations, one or more mixed sulphides being doped with one or more lower-valent cations, and any mixture thereof;
  wherein the catalytic composition comprises a catalytic support that is electrically conductive particles;
  wherein said process comprises as step of pre-heating with a gaseous stream said fluidized bed reactor before conducting said endothermic steam reforming reaction in the fluidized bed reactor, and wherein the hydrocarbon feedstock in presence of steam is pre-heated to a temperature of 560° C. to 650° C.; and
  wherein the step (c) of heating the fluidized bed is performed by passing an electric current through the fluidized bed and the reactor has an outlet temperature ranging from 800° C. to 1200° C.

2. The process according to claim 1, characterized in that the electrically conductive particles of the bed are or comprise one or more non-metallic resistors selected from silicon carbide, molybdenum disilicide, or a mixture thereof.

3. The process according to claim 1, characterized in that the electrically conductive particles of the bed are or comprise one or more mixed oxides being doped with one or more lower-valent cations that are one or more oxides having a cubic fluorite structure being at least partially substituted with one or more lower-valent cations selected from the group consisting of Sm, Gd, Y, Sc, Yb, Mg, Ca, La, Dy, Er, and Eu.

4. The process according to claim 3, characterized in that the mixed oxides being doped with one or more lower-valent cations are selected from the group consisting of:
  one or more $ABQ_3$-perovskites with A and B tri-valent cations, being at least partially substituted in A position with one or more lower-valent cations and comprising at least one of Ni, Ga, Co, Cr, Mn, Sc, Fe and/or a mixture thereof in B position, characterized in that the one or more lower-valent cations are selected from Ca, Sr, or Mg;
  one or more $ABQ_3$-perovskites with A bivalent cation and B tetra-valent cation, being at least partially substituted with one or more lower-valent cations in the B position occurs or with a mixture of different B elements in the B position, characterized in that the one or more lower-valent cations are magnesium, scandium, yttrium, neodymium or ytterbium; and
  one or more $A_2B_2O_7$-pyrochlores with A trivalent cation and B tetra-valent cation being at least partially substituted in A position with one or more lower-valent cations and comprise at least one of Sn, Zr and Ti in B position, characterized in that the one or more lower-valent cations are Ca or Mg.

5. The process according to claim 1, characterized in that the electrically conductive particles of the bed are or comprise one or more superionic conductors selected from the group consisting of $LiAlSiO_4$, $Li_{10}GeP_2S_{12}$, $Li_{3.6}Si_{0.6}P_{0.4}O_4$, sodium superionic conductors, and sodium beta alumina.

6. The process according to claim 1, characterized in that the catalytic composition comprises one or more transition metals selected from the group consisting of Ni, Cu, Co, Mo, Pt, Pd, Rh, Ru and Au in a content ranging between 0.1 and 60.0 wt. % of the total weight of said catalytic composition.

7. The process according to claim 1, characterized in that said catalytic support is selected from $Al_2O_3$, $TiO_2$, $ZrO_2$, $HfO_2$, $La_2O_3$, and/or MgO.

8. The process according to claim 1, characterized in that said gaseous stream is a stream of inert gas.

9. The process according to claim 1, characterized in that, wherein the at least one fluidized bed reactor provided in step a) comprises a heating zone and a reaction zone and wherein the fluid stream provided in step b) is provided to the heating zone and comprises diluent gases, the step c) of heating the fluidized bed to a temperature ranging from 500° C. to 1200° C. to conduct the steam reforming reaction of a hydrocarbon feedstock comprises the following sub-steps:

heating the fluidized bed to a temperature ranging from 500° C. to 1200° C. by passing an electric current through the heating zone of the at least one fluidized bed, transporting the heated particles from the heating zone to the reaction zone, in the reaction zone, putting the heated particles in a fluidized state by passing upwardly through the said bed of the reaction zone a fluid stream comprising a hydrocarbon feedstock, steam and optional diluent gases to obtain a fluidized bed and to conduct the steam reforming reaction on the hydrocarbon feedstock, and recovering the particles from the reaction zone and recycling them to the heating zone.

10. An installation to perform an endothermic steam reforming of hydrocarbons to produce synthesis gas according to claim 1, said installation comprising at least one fluidized bed reactor comprising:

at least two electrodes (13); a reactor vessel (3);

one or more fluid nozzles (21, 23) for the introduction of a fluidizing gas and/or of a reaction stream within at least one fluidized bed reactor;

and a bed (25) comprising particles;

the installation is characterized in that the particles of the bed (25) comprise electrically conductive particles and particles of a catalytic composition, wherein at least 10 wt. % of the particles based on the total weight of the particles of the bed (25) are electrically conductive particles, have a resistivity ranging from 0.001 Ohm·cm to 500 Ohm·cm at 800° C. wherein the electrically conductive particles are or comprise one or more particles selected from the group consisting of one or more non-metallic resistors, one or more metallic carbides, one or more transition metal nitrides, one or more metallic phosphides, one or more superionic conductors, one or more phosphate electrolytes, one or more mixed oxides being doped with one or more lower-valent cations, one or more mixed sulphides being doped with one or more lower-valent cations, and any mixture thereof.

11. The installation according to claim 10, characterized in that the fluidized bed reactor is devoid of heating means.

12. The installation according to claim 10, characterized in that the at least one fluidized bed reactor comprises a heating zone and a reaction zone (29), and one or more fluid nozzles (23) to provide a hydrocarbon feedstock to the reaction zone (29).

13. The installation according to claim 10, characterized in that the at least one fluidized bed reactor further comprises means (35) to transport the particles from the reaction zone (29) back to the heating zone (27).

14. The installation according to claim 10, characterized in that it comprises at least two fluidized bed reactors (37, 39) connected one to each other wherein at least one reactor (37) is the heating zone (27) and at least another reactor (39) is the reaction zone (29).

15. The installation according to claim 10, characterized in that the at least one fluidized bed reactor (19) is a single one fluidized bed reactor wherein the heating zone (27) is the bottom part of the fluidized bed reactor (19) while the reaction zone (29) is the top part of the fluidized bed reactor (19).

16. The installation according to claim 10, characterized in that the at least one fluidized bed (18) comprises at least two lateral zones being an outer zone and an inner zone wherein the outer zone is surrounding the inner zone, with the outer zone being the heating zone (27) and the inner zone being the reaction zone (29).

\* \* \* \* \*